(12) United States Patent
Nishikata et al.

(10) Patent No.: US 11,307,812 B2
(45) Date of Patent: Apr. 19, 2022

(54) IMAGE FORMING APPARATUS TO SHORTEN TIME CONSUMED FROM RECEPTION OF IMAGE FORMATION COMMAND TO COMPLETE IMAGE FORMING PROCESS, IMAGE FORMING SYSTEM, AND NON-TRANSITORY COMPUTER READABLE MEDIUM

(71) Applicant: FUJIFILM Business Innovation Corp., Tokyo (JP)

(72) Inventors: Takumi Nishikata, Kanagawa (JP); Kazunobu Uchiyama, Kanagawa (JP); Eiichi Waida, Kanagawa (JP); Yusuke Chika, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/121,677

(22) Filed: Dec. 14, 2020

(65) Prior Publication Data
US 2021/0373816 A1 Dec. 2, 2021

(30) Foreign Application Priority Data
May 27, 2020 (JP) .............................. JP2020-092735

(51) Int. Cl.
*G03G 15/00* (2006.01)
*G06F 3/12* (2006.01)
*G03G 15/16* (2006.01)

(52) U.S. Cl.
CPC ....... *G06F 3/1207* (2013.01); *G03G 15/5075* (2013.01); *G03G 15/5087* (2013.01);
(Continued)

(58) Field of Classification Search
CPC .......... G03G 15/6529; G03G 15/6561; G03G 15/238; G03G 15/1605; G03G 21/1604;
(Continued)

(56) References Cited

U.S. PATENT DOCUMENTS 10,082,986 B2  9/2018  Wang
2004/0178565 A1*  9/2004  Reeves .................. B65H 29/12
                                            271/225
(Continued)

FOREIGN PATENT DOCUMENTS

JP   2018051857    4/2018
JP   2018205652    12/2018

*Primary Examiner* — Walter L Lindsay, Jr
*Assistant Examiner* — Laura Roth
(74) *Attorney, Agent, or Firm* — JCIPRNET

(57) ABSTRACT

An image forming apparatus includes a first processor configured to control a transporter that transports a sheet and a first image forming section that forms an image on the sheet transported by the transporter, and a second processor configured to control a second image forming section that forms an image on the sheet transported by the transporter. The first processor and the second processor are contained in a single housing. The first processor is configured to perform transport preparation for transporting the sheet at the transporter and receive, from the second processor, a completion notification corresponding to a preparation command, for performing image formation preparation in the second image forming section, transmitted to the second processor via an inside of the housing, and subsequently cause the transporter to transport the sheet and the first image forming section to form the image.

7 Claims, 13 Drawing Sheets

TO FIG. 6B

(52) U.S. Cl.
CPC ..... *G03G 15/6529* (2013.01); *G03G 15/6561* (2013.01); *G03G 15/1605* (2013.01); *G03G 2215/00021* (2013.01); *G03G 2215/00126* (2013.01)

(58) Field of Classification Search
CPC ............... G03G 15/50; G03G 15/5075; G03G 15/5087; G03G 15/55; G03G 15/80; G03G 2215/00021; G03G 2215/00109; G03G 2215/00126; G06F 3/1207
See application file for complete search history.

(56) References Cited

U.S. PATENT DOCUMENTS

| | | | | |
|---|---|---|---|---|
| 2006/0055767 | A1* | 3/2006 | Mochimaru | G03G 15/5008 347/234 |
| 2015/0063848 | A1* | 3/2015 | Ikuta | B65H 5/062 399/45 |
| 2016/0378041 | A1* | 12/2016 | Kidera | G03G 15/6529 399/16 |
| 2018/0210383 | A1* | 7/2018 | Furukawa | G06F 3/1278 |
| 2019/0129337 | A1* | 5/2019 | Watanabe | G03G 15/0189 |
| 2020/0096912 | A1* | 3/2020 | Goda | G03G 21/1604 |
| 2021/0141326 | A1* | 5/2021 | Nishikata | G03G 21/14 |
| 2021/0141329 | A1* | 5/2021 | Nishikata | B65H 7/20 |

* cited by examiner

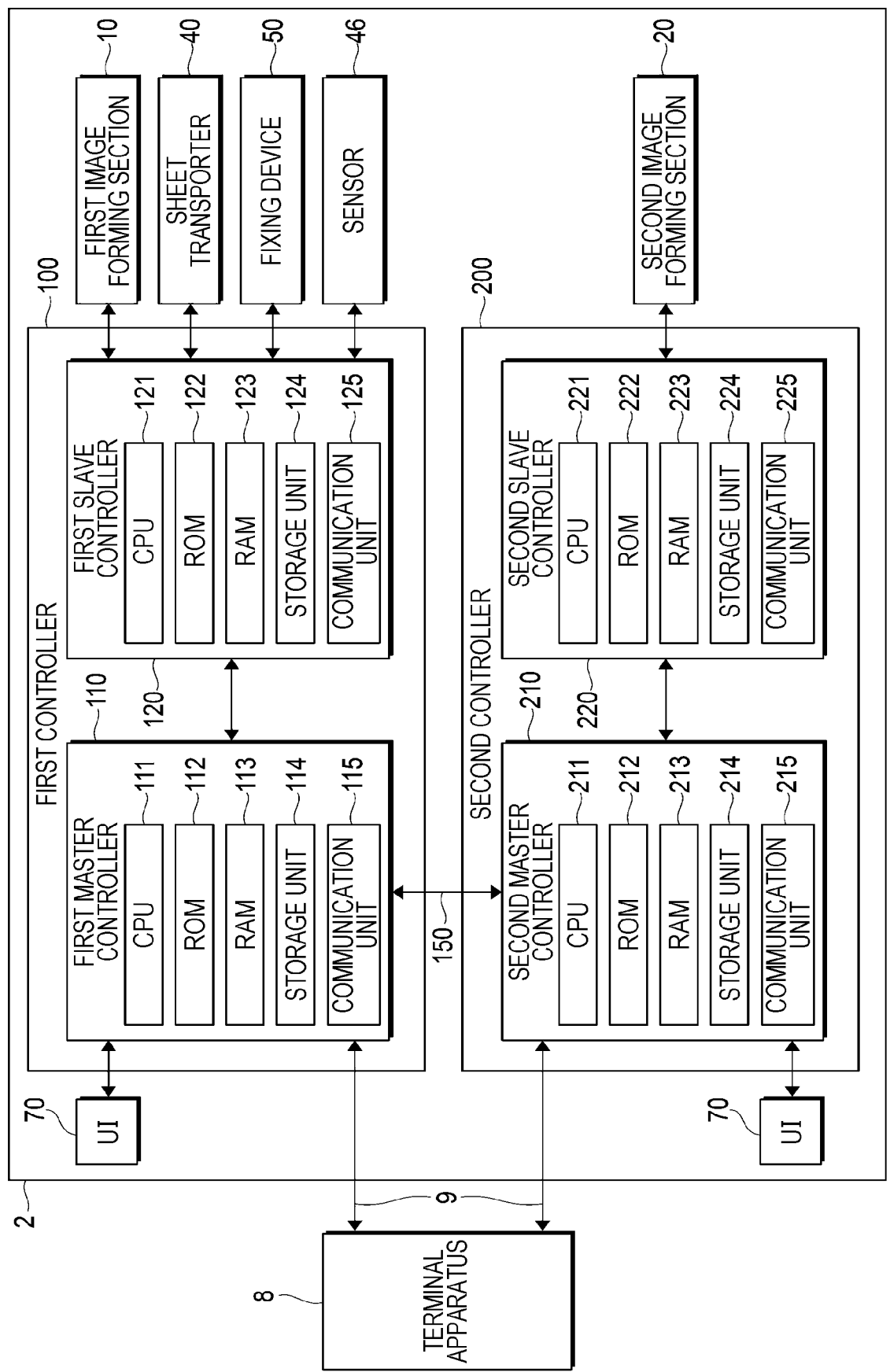

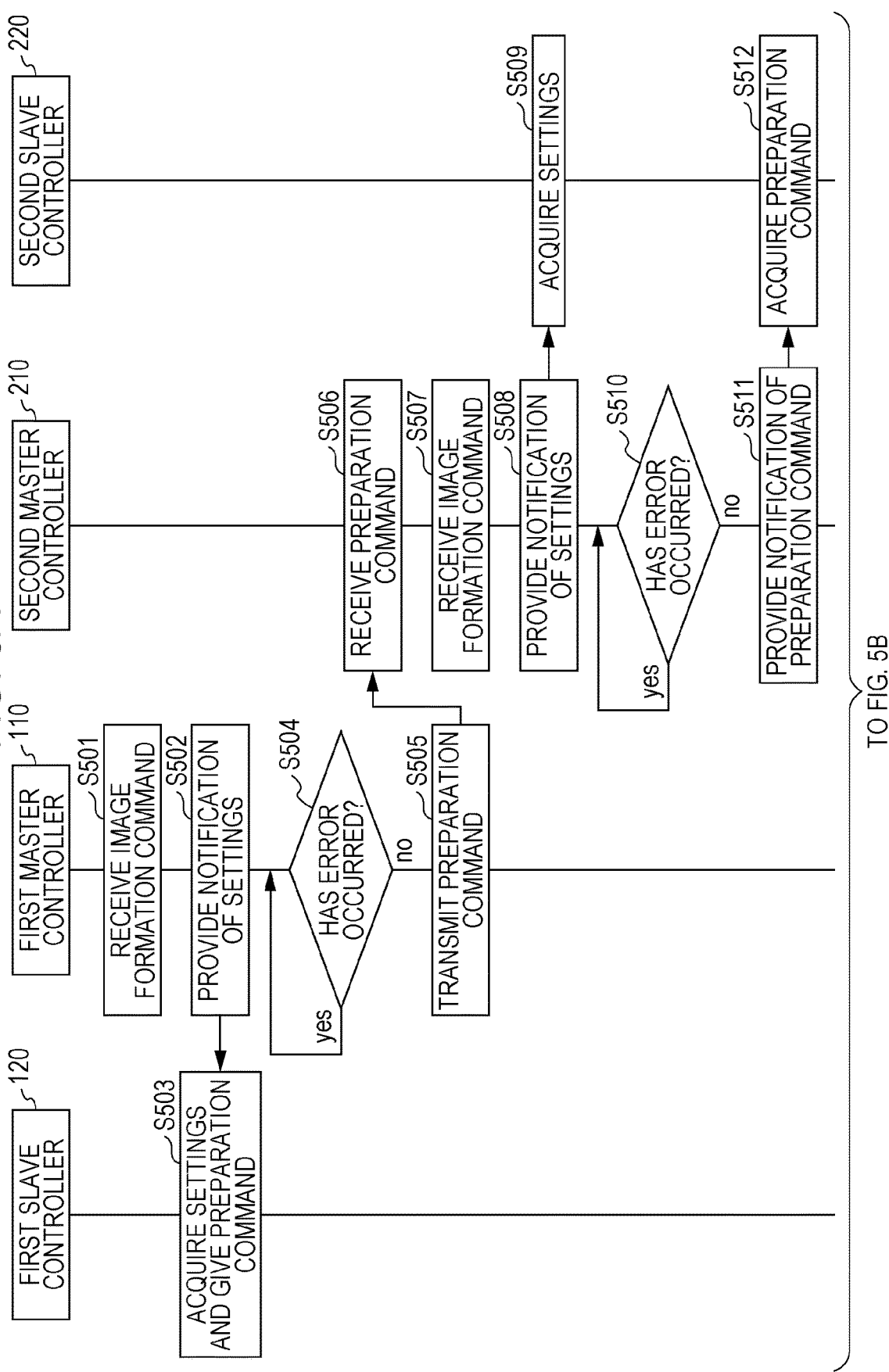

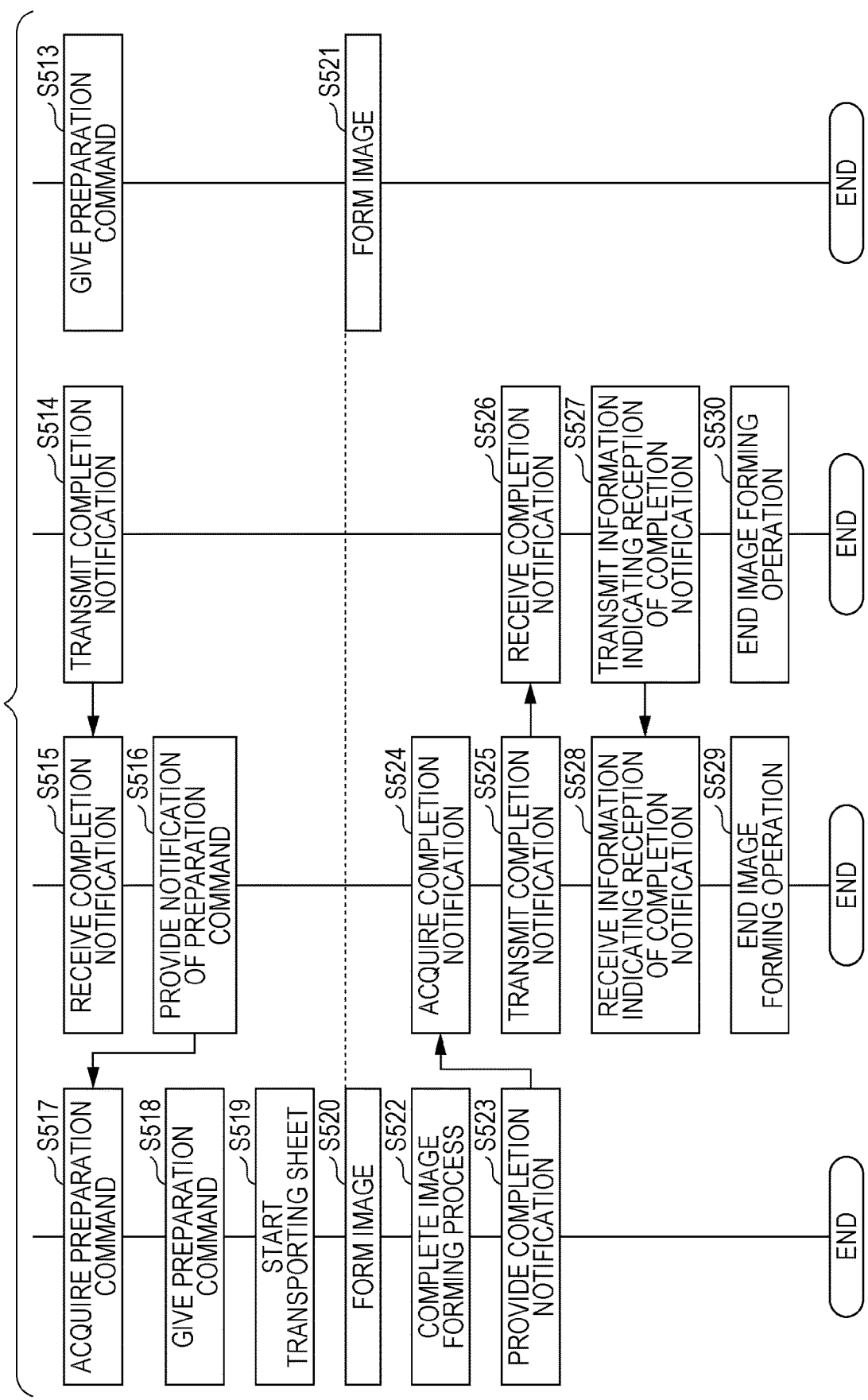

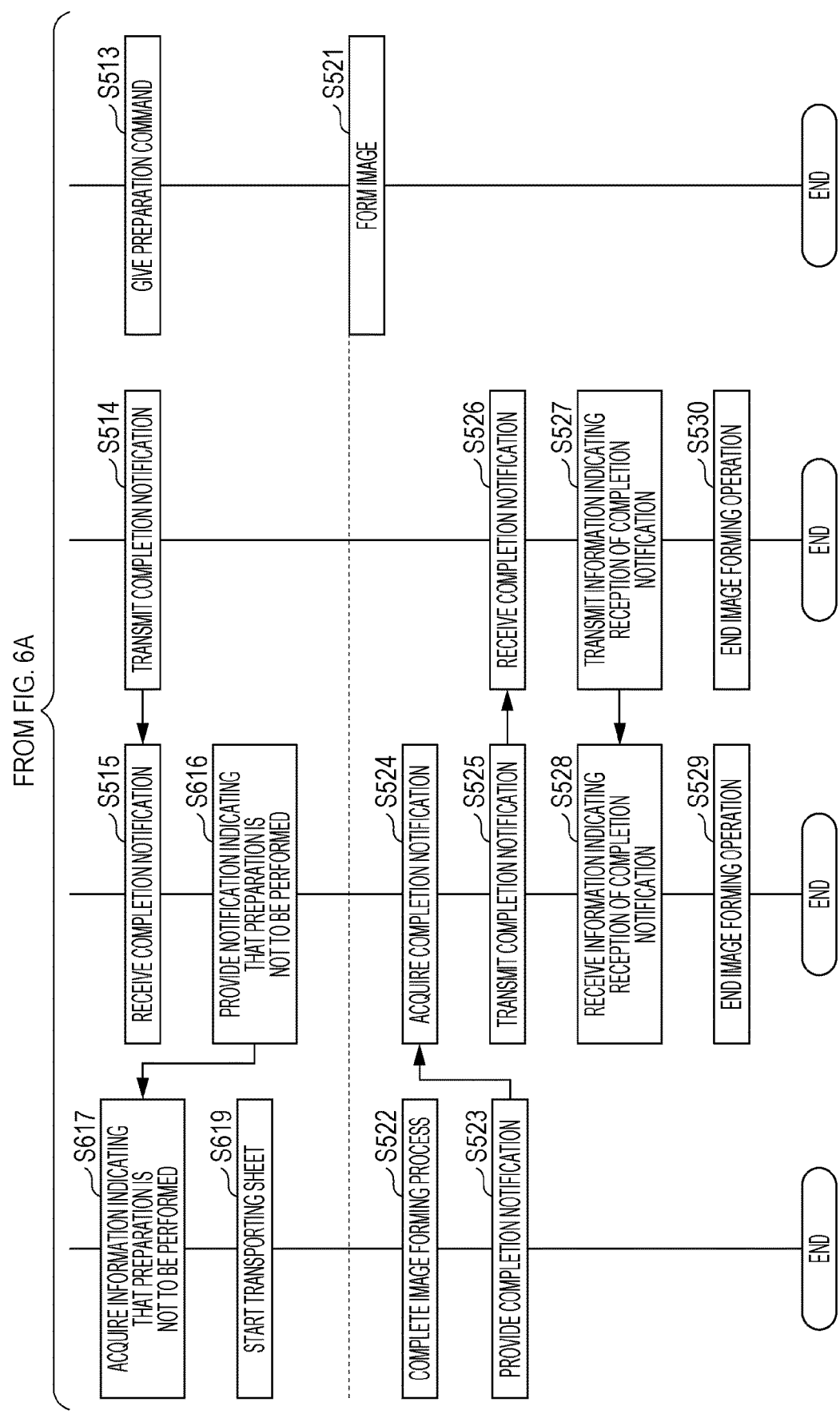

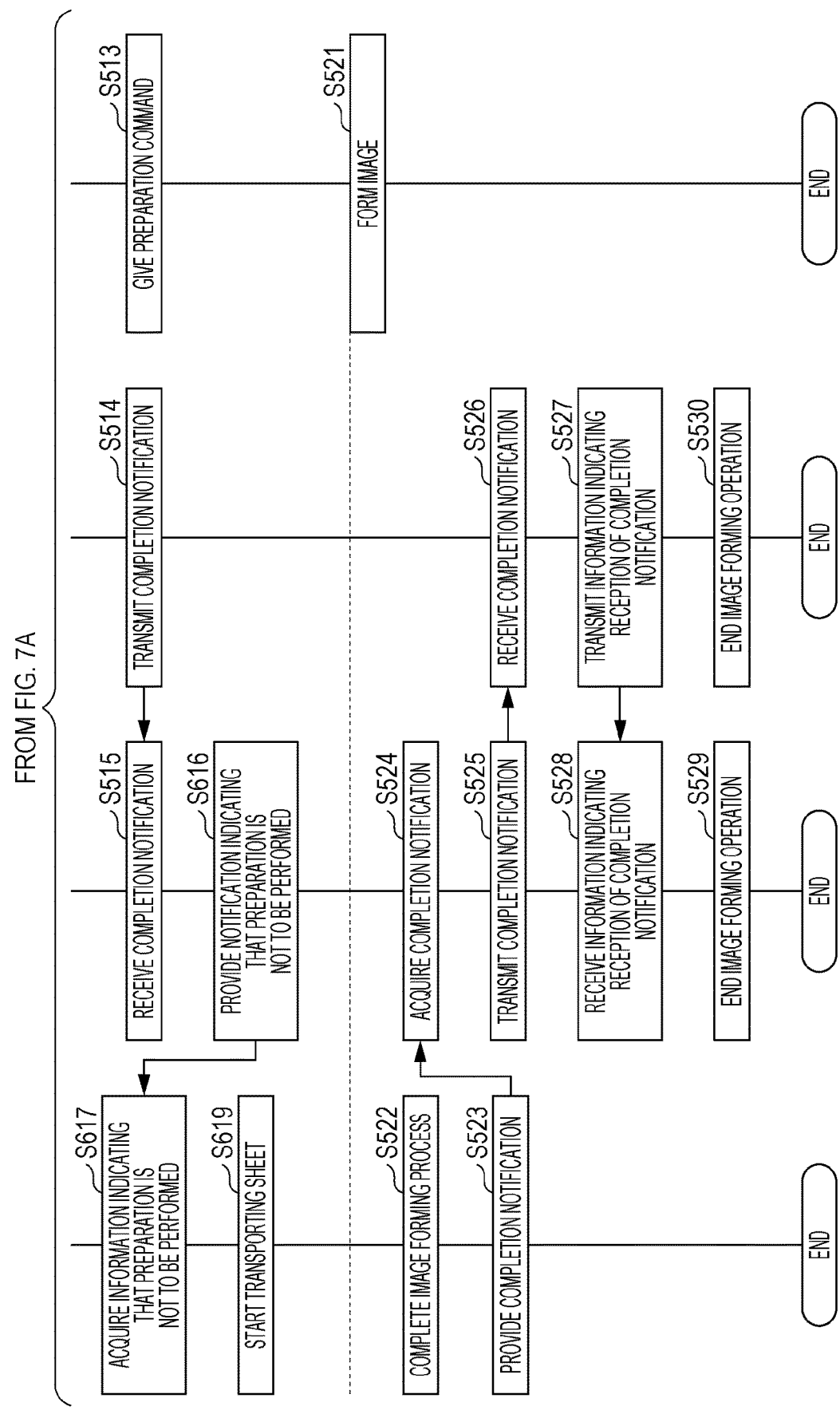

IMAGE FORMING APPARATUS TO SHORTEN TIME CONSUMED FROM RECEPTION OF IMAGE FORMATION COMMAND TO COMPLETE IMAGE FORMING PROCESS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-092735 filed May 27, 2020.

BACKGROUND

(i) Technical Field

The present disclosure relates to image forming apparatuses, image forming systems, and non-transitory computer readable media.

(ii) Related Art

In a technology proposed in the related art, two image forming sections form images on a single sheet.

For example, Japanese Unexamined Patent Application Publication No. 2018-205652 discloses an image forming system having the following configuration. Specifically, the image forming system includes a first image forming apparatus and a second image forming apparatus. The first image forming apparatus includes an image processing controller, a first controller, and an image forming section. The second image forming apparatus includes a second controller and an image forming section. When performing duplex printing, the image forming system feeds a sheet from a sheet feeder and causes the first image forming apparatus to perform printing on the front face of the sheet. Subsequently, the image forming system causes an inverting mechanism to invert the sheet, and transports the sheet to the second image forming apparatus. Then, the image forming system causes the second image forming apparatus to perform printing on the rear face of the sheet. After performing printing on the rear face of the sheet, the image forming system outputs the sheet to a paper output tray.

SUMMARY

For example, in a single image forming apparatus having a single housing, it is conceivable that the single housing contains therein two image forming sections that form images on a single sheet and two controllers that respectively control the two image forming sections, and that one of the controllers controls the transporting of the sheet. In such a configuration, when images are to be formed at the two image forming sections, the two controllers each receive an image formation command given for forming images at the two image forming sections. In contrast, in a case of an image formation command given for not forming an image at one of the two image forming sections but for forming an image at the other image forming section controlled by a second one of the controllers, it is conceivable that the second controller receives the image formation command while the first controller does not receive the image formation command. In such a case, if the first controller starts image formation preparation, such as preparation for a sheet transporting process, to be controlled by the first controller after receiving a notification indicating that image formation preparation is completed from the second controller, the time consumed from the reception of the image formation command to the completion of the image forming process becomes too long.

Aspects of non-limiting embodiments of the present disclosure relate to an image forming apparatus that may shorten the time consumed from the reception of an image formation command to the completion of an image forming process, involving forming an image at a second image forming section but not forming an image at a first image forming section, as compared with a case where a first controller does not prepare for the image forming process until it receives a completion notification from a second controller.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a first processor configured to control a transporter that transports a sheet and a first image forming section that forms an image on the sheet transported by the transporter, and a second processor configured to control a second image forming section that forms an image on the sheet transported by the transporter. The first processor and the second processor are contained in a single housing. When the first processor receives an image formation command from outside the housing and determines to perform an image forming process at the first image forming section, the first processor is configured to perform transport preparation for transporting the sheet at the transporter and receive, from the second processor, a completion notification corresponding to a preparation command, for performing image formation preparation in the second image forming section, transmitted to the second processor via an inside of the housing, and subsequently cause the transporter to transport the sheet and the first image forming section to form the image. If the first processor ascertains that an independent process involving not forming the image at the first image forming section but forming the image at the second image forming section is to be performed, the first processor is configured to perform the transport preparation before receiving the completion notification, and cause the transporter to transport the sheet after receiving the completion notification.

BRIEF DESCRIPTION OF THE DRAWINGS

An exemplary embodiment of the present disclosure will be described in detail based on the following figures, wherein:

FIG. 4 is a block diagram illustrating an example of a hardware configuration of a first controller and a second controller;

FIGS. 5A and 5B illustrate an example of a process performed by the first controller and the second controller;

FIGS. 6A and 6B illustrate an example of a process performed by the first controller and the second controller when a first master controller and a second master controller each receive a second independent command;

FIGS. 7A and 7B illustrate an example of a process performed by the first controller and the second controller when the first master controller receives a first independent command and determines to perform an independent process;

DETAILED DESCRIPTION

An exemplary embodiment of the disclosure will be described below with reference to the appended drawings.

Figure 1:
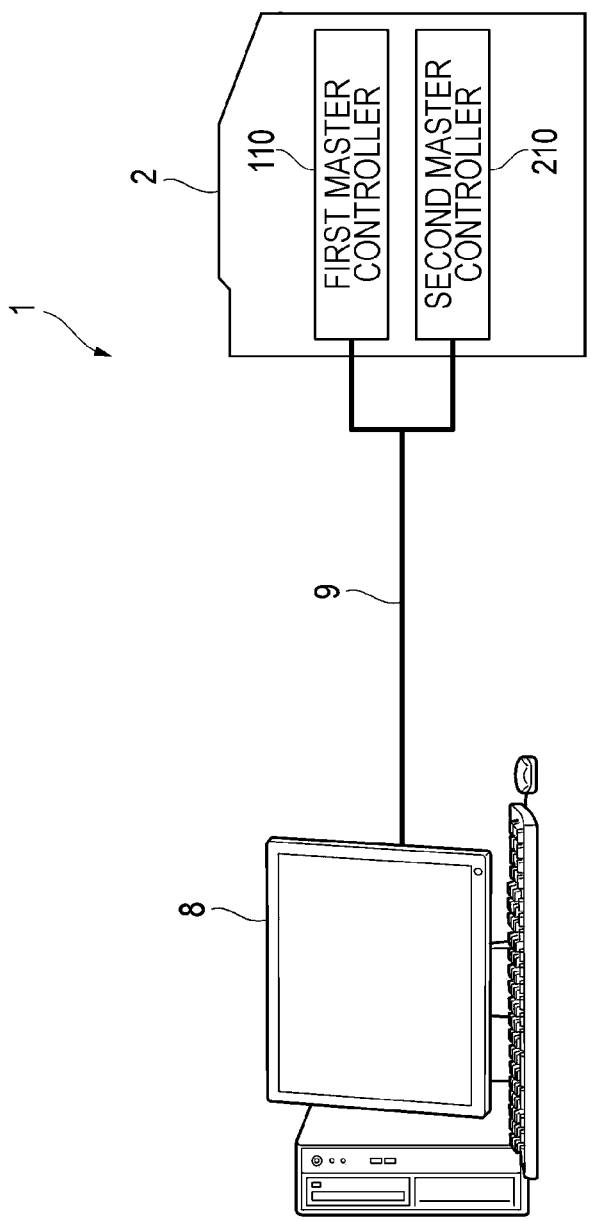
FIG. 1 schematically illustrates an example of an image forming system according to an exemplary embodiment.

FIG. 1 schematically illustrates an example of an image forming system 1 according to an exemplary embodiment.

Figure 2:
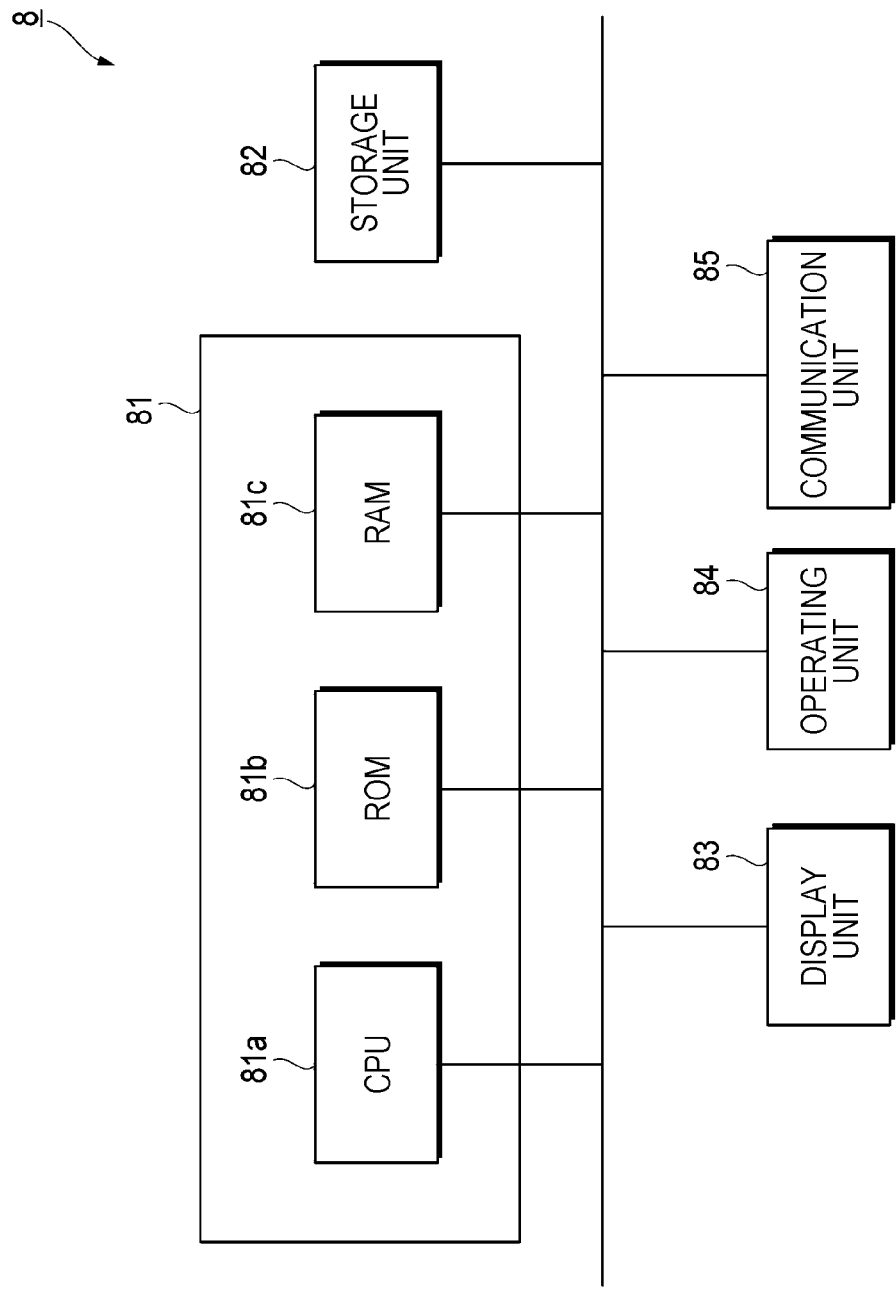
FIG. 2 illustrates an example of a hardware configuration of a terminal apparatus.

FIG. 2 illustrates an example of a hardware configuration of a terminal apparatus 8.

Figure 3:
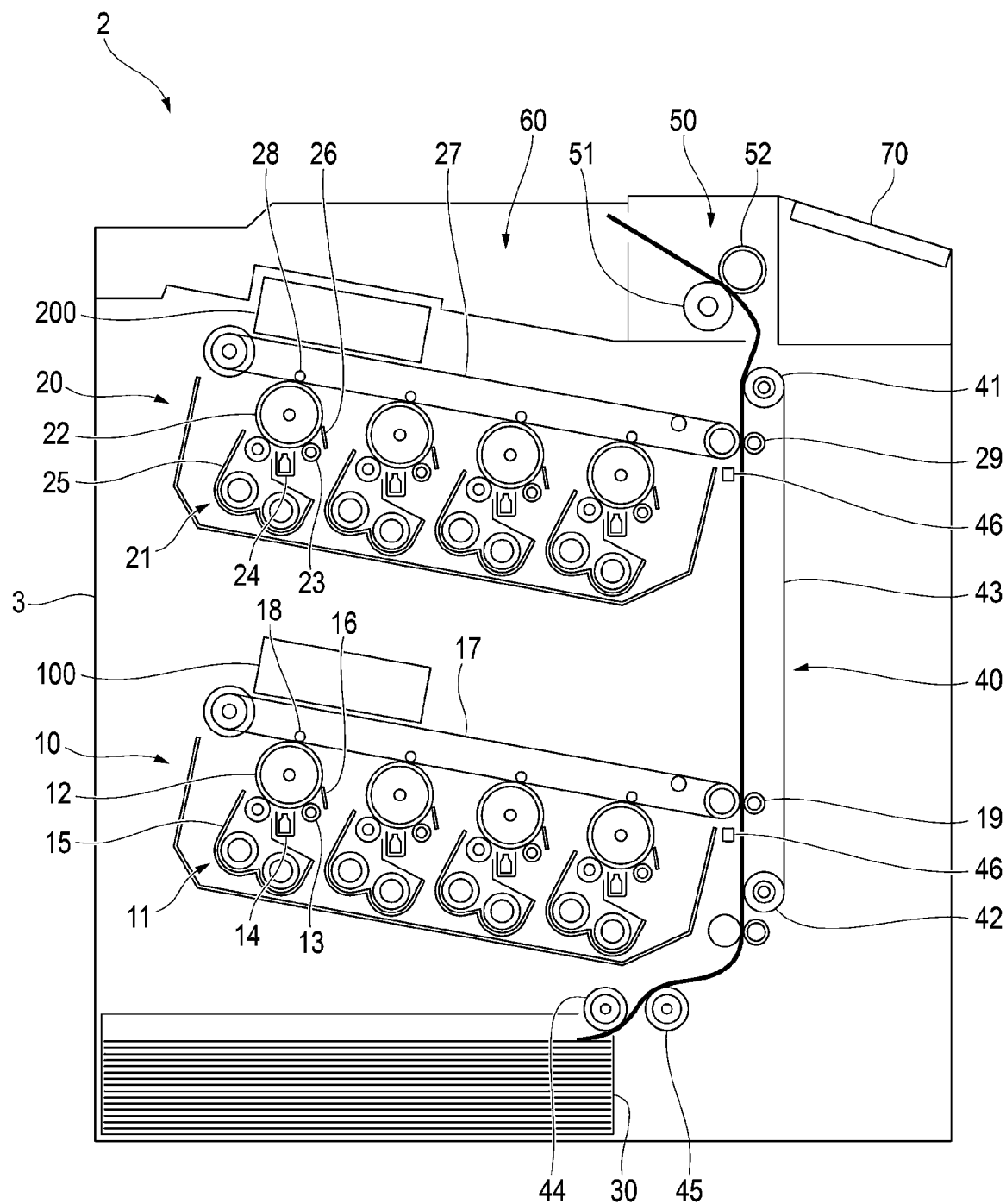
FIG. 3 schematically illustrates an example of an internal structure of an image forming apparatus.

FIG. 3 schematically illustrates an example of an internal structure of an image forming apparatus 2.

The image forming system 1 includes the image forming apparatus 2 and the terminal apparatus 8 connected to the image forming apparatus 2 by using a communication line 9. Although a single image forming apparatus 2 and a single terminal apparatus 8 are shown in FIG. 1, multiple image forming apparatuses 2 and multiple terminal apparatuses 8 may be provided.

The image forming apparatus 2 has a single housing 3 that contains therein a first image forming section 10 and a second image forming section 20 serving as two image forming sections that form images on a single sheet, a first controller 100 that controls the first image forming section 10, and a second controller 200 that controls the second image forming section 20. Furthermore, in the image forming apparatus 2, the first controller 100 controls a sheet transporter 40 that transports a sheet. The image forming apparatus 2 will be described in detail later.

Terminal Apparatus

The terminal apparatus 8 includes a controller 81 that controls the entire apparatus, a storage unit 82 used for storing data, a display unit 83 used for displaying an operation reception screen and an image, an operating unit 84 that receives an input operation from a user, and a communication unit 85 used for communicating with an external apparatus.

The controller 81 is constituted of a central processing unit (CPU) 81a, a read-only memory (ROM) 81b, and a random access memory (RAM) 81c. The ROM 81b stores therein a basic program (operating system) to be executed by the CPU 81a, as well as various settings. The CPU 81a uses the RAM 81c as a work area and executes, for example, application programs read from the ROM 81b and the storage unit 82. The CPU 81a executes the programs so as to control the components of the terminal apparatus 8.

An example of the storage unit 82 is a semiconductor memory. For example, the storage unit 82 stores therein an application program, such as a document creation application, a printer driver, and a spooler. For example, the document creation application generates a command for forming a document image on a sheet. The printer driver acquires the image formation command output from the document creation application and converts the image formation command into a command in a format analyzable by the image forming apparatus 2. The spooler temporarily stores the converted command output from the printer driver, waits until the image forming apparatus 2 completes an image forming process, and outputs a subsequent command.

In more detail, for example, after acquiring the image formation command output from the document creation application, the printer driver converts the image formation command into a command in a format analyzable by the first controller 100 and a command in a format analyzable by the second controller 200 in view of the characteristics of the first image forming section 10 and the second image forming section 20. Furthermore, the spooler outputs the command for the first controller 100 to the first controller 100, and outputs the command for the second controller 200 to the second controller 200. In the following description, the converted command output from the spooler may sometimes be referred to as "image formation command".

The display unit 83 displays, for example, still images and moving images. Examples of the display unit 83 include a liquid crystal display and an electroluminescence (EL) display.

The operating unit 84 is an input device that receives an operation from a user. Examples of the operating unit 84 include a button, a switch, and a touchscreen.

An example of the communication unit 85 is a communication interface.

Examples of the terminal apparatus 8 having the above-described configuration include a notebook personal computer (PC), a desktop PC, a tablet PC, a tablet terminal, a multifunction portable telephone (i.e., so-called "smartphone"), a portable telephone (i.e., so-called "feature phone"), and a portable information terminal (i.e., personal digital assistant (PDA)).

Image Forming Apparatus

The image forming apparatus 2 includes the first image forming section 10 that forms an image on a sheet as an example of a recording medium, and also includes the second image forming section 20 that forms an image on the sheet. The image forming apparatus 2 also includes a sheet retainer 30 that retains sheets and the sheet transporter 40 that transports each sheet retained in the sheet retainer 30 to, for example, the first image forming section 10. Moreover, the image forming apparatus 2 includes a fixing device 50 that applies heat and pressure onto a toner image formed on the sheet so as to fix the toner image onto the sheet, a sheet load section 60 on which the sheet having the image formed thereon as a result of the toner image being fixed thereon at the fixing device 50 is loaded, and a user interface (sometimes referred to as "UI" hereinafter) 70 that displays information. Furthermore, the image forming apparatus 2 includes the first controller 100 that controls the first image forming section 10, the sheet transporter 40, and the fixing device 50, and also includes the second controller 200 that controls the second image forming section 20.

The first image forming section 10 includes four image forming units 11 that are arranged parallel to one another at fixed intervals and that form toner images in the colors of toners contained therein. Each image forming unit 11 includes a photoconductor drum 12 that retains a toner image, a charging device 13 that electrostatically charges the surface of the photoconductor drum 12, and a light-emitting-diode (LED) print head 14 that exposes the photoconductor drum 12 electrostatically charged by the charging device 13 to light based on corresponding-color image data so as to form an electrostatic latent image on the photoconductor drum 12. Each image forming unit 11 further includes a developing device 15 that develops the electrostatic latent image formed on the photoconductor drum 12 and a drum cleaner 16 that cleans the photoconductor drum 12 after a transfer process. In the four image forming units 11 according to this exemplary embodiment, the developing devices 15 contain yellow (Y), magenta (M), cyan (C), and black (K) toners, respectively, and form toner images of the respective colors.

Furthermore, the first image forming section 10 includes an intermediate transfer belt 17 onto which the toner images of the respective colors formed on the photoconductor drums 12 of the individual image forming units 11 are superposed and transferred. Moreover, the first image forming section 10 includes first transfer rollers 18 that sequentially transfer (first-transfer) the toner images of the respective colors formed at the individual image forming units 11 onto the intermediate transfer belt 17, and also includes a second transfer roller 19 that collectively transfers (second-transfers) the toner images superposed and transferred on the intermediate transfer belt 17 onto the sheet.

Similar to the first image forming section 10, the second image forming section 20 includes four image forming units 21, an intermediate transfer belt 27, first transfer rollers 28, and a second transfer roller 29. Similar to the image forming units 11, the image forming units 21 each include a photoconductor drum 22, a charging device 23, an LED print head 24, a developing device 25, and a drum cleaner 26. In the four image forming units 21 according to this exemplary embodiment, the developing devices 25 contain therein white, gold, silver, and clear toners, respectively, and form toner images of the respective colors. The colors of the toners contained in the developing devices 25 of the image forming units 21 are not limited to the aforementioned colors. For example, the colors may alternatively be red, blue, and green.

The sheet transporter 40 includes an upper roller 41 and a lower roller 42 disposed apart from each other in the vertical direction, and also includes a transport belt 43 wrapped around the upper roller 41 and the lower roller 42. Furthermore, the sheet transporter 40 includes a feed roller 44 that feeds each sheet retained in the sheet retainer 30 toward the transport belt 43, and also includes a transport roller 45 disposed between the feed roller 44 and the transport belt 43. The sheet transporter 40 also includes multiple sensors 46 that detect the passing of a transported sheet.

The fixing device 50 includes a heating roller 51 that heats a transported sheet, and also includes a belt module 52 that is pressed against the heating roller 51 and that forms a pressure unit together with the heating roller 51. The fixing device 50 applies heat and pressure, at the pressure unit, onto a sheet having a toner image, so as to fix the toner image onto the sheet.

The UI 70 is, for example, a display panel that receives information from a user and that displays information to the user.

The image forming apparatus 2 having the above-described configuration operates as follows.

The toner images of the four colors formed on the photoconductor drums 12 in the image forming units 11 of the first image forming section 10 are first-transferred onto the intermediate transfer belt 17 by the first-transfer rollers 18, so that a superposed toner image constituted of the superposed toners of the four colors is formed on the intermediate transfer belt 17. Then, as the intermediate transfer belt 17 moves, the superposed toner image on the intermediate transfer belt 17 is transported to a second-transfer unit where the second-transfer roller 19 is disposed.

When the superposed toner image in the first image forming section 10 is transported to the second-transfer unit, a sheet is fed from the sheet container 30 to the second-transfer unit in accordance with this timing. Then, at the second-transfer unit, the superposed toner image is collectively second-transferred onto the transported sheet in accordance with a transfer electric field produced by the second-transfer roller 19.

The toner images of the remaining four colors formed on the photoconductor drums 22 in the image forming units 21 of the second image forming section 20 are first-transferred onto the intermediate transfer belt 27 by the first-transfer rollers 28, so that a superposed toner image constituted of the superposed toners of the remaining four colors is formed on the intermediate transfer belt 27. Then, as the intermediate transfer belt 27 moves, the superposed toner image on the intermediate transfer belt 27 is transported to a second-transfer unit where the second-transfer roller 29 is disposed.

When the superposed toner image in the second image forming section 20 is transported to the second-transfer unit, the sheet having the superposed toner image electrostatically transferred thereon at the first image forming section 10 is fed to this second-transfer unit in accordance with this timing. Then, at the second-transfer unit, the superposed toner image in the second image forming section 20 is collectively second-transferred onto the superposed toner image on the transported sheet, having the superposed toner image electrostatically transferred thereon at the first image forming section 10, in accordance with a transfer electric field produced by the second-transfer roller 29.

Subsequently, the sheet having electrostatically transferred thereon a superposed toner image constituted of the superposed toner image in the first image forming section 10 and the superposed toner image in the second image forming section 20 is transported to the fixing device 50. The toner image on the sheet transported to the fixing device 50 receives heat and pressure applied by the fixing device 50, so as to be fixed onto the sheet. Then, the sheet having the fixed image thereon is transported to the sheet load section 60 of the image forming apparatus 2.

FIG. 4 is a block diagram illustrating an example of a hardware configuration of the first controller 100 and the second controller 200.

First Controller 100

The first controller 100 includes a first master controller 110 that controls the operation of, for example, the first image forming section 10, the sheet transporter 40, and the fixing device 50, and also includes a first slave controller 120 that controls the operation of these devices under the control of the first master controller 110.

The first master controller 110 includes a central processing unit (CPU) 111, a read-only memory (ROM) 112, a random access memory (RAM) 113, a storage unit 114, such as a semiconductor memory, and a communication unit 115 used for communicating with an external apparatus. An example of the communication unit 115 is a communication interface (I/F).

The ROM 112 stores therein a basic program (operating system) to be executed by the CPU 111, as well as various settings. The CPU 111 uses the RAM 113 as a work area and executes programs read from the ROM 112 and the storage unit 114. The CPU 111 executes the programs so that functions of the first master controller 110 to be described below are realized.

The first master controller 110 exchanges information with the first slave controller 120, the second controller 200, and the UI 70 via the communication unit 115.

Furthermore, the first master controller 110 receives an image formation command from an external source, such as the terminal apparatus 8, via the communication unit 115. The first master controller 110 analyzes the received image formation command. The image formation command contains image data as data of an image to be formed, as well as designated image formation settings. Examples of the image formation settings include the size and the material of a sheet on which the image is to be formed, and the colors of colorants to be used.

The first master controller 110 also performs predetermined image processing on the received image data. The first master controller 110 converts the image data into YMCK data with respect to the reproduction colors of the first image forming section 10, that is, the colors (yellow (Y), magenta (M), cyan (C), and black (K)) of the toners serving as the colorants of the first image forming section 10, and outputs the YMCK data. The YMCK data is constituted of Y-color data, M-color data, C-color data, and K-color data that are separated from one another for the individual colors.

Furthermore, the first master controller 110 notifies the first slave controller 120 of the size and the material of the sheet according to the received image formation command.

Similar to the first master controller 110, the first slave controller 120 includes a CPU 121, a ROM 122, a RAM 123, a storage unit 124, and a communication unit 125. The CPU 121 uses the RAM 123 as a work area and executes programs read from the ROM 122 and the storage unit 124, so that functions of the first slave controller 120 to be described below are realized.

The first slave controller 120 exchanges control information with the first master controller 110 so as to perform control of, for example, exposure, development, and transfer processes in the first image forming section 10, sheet feed and transport processes by the sheet transporter 40 in accordance with a transfer timing, and a toner-image fixing process by the fixing device 50.

Furthermore, the first slave controller 120 acquires information about an error, such as a toner shortage in the first image forming section 10 or a paper jam in the sheet transporter 40. The first slave controller 120 notifies the first master controller 110 of this error information. The first master controller 110 notifies the user of this error information by displaying the error information on the display panel of the UI 70. Then, for example, if the error is a toner shortage, the first slave controller 120 acquires information indicating that the error has been resolved when the toner is resupplied. If the error is a paper jam, for example, the first slave controller 120 acquires information indicating that the error has been resolved when the paper jam is removed. Then, the first slave controller 120 notifies the first master controller 110 that the error has been resolved. The first master controller 110 notifies the user that the error has been resolved by displaying a message on the display panel of the UI 70.

Second Controller 200

The second controller 200 includes a second master controller 210 that controls the operation of the second image forming section 20, and also includes a second slave controller 220 that controls the operation of the second image forming section 20 under the control of the second master controller 210. The second master controller 210 exchanges information with the first master controller 110 via a connection line 150.

The second master controller 210 includes a CPU 211, a ROM 212, a RAM 213, a storage unit 214, such as a semiconductor memory, and a communication unit 215 used for communicating with an external apparatus.

The ROM 212 stores therein a basic program (operating system) to be executed by the CPU 211, as well as various settings. The CPU 211 uses the RAM 213 as a work area and executes programs read from the ROM 212 and the storage unit 214. The CPU 211 executes the programs so that functions of the second master controller 210 to be described below are realized.

The second master controller 210 exchanges information with the second slave controller 220, the first controller 100, and the UI 70 via the communication unit 215.

Furthermore, the second master controller 210 receives an image formation command from, for example, a user terminal (such as a PC) via the communication unit 215. The second master controller 210 analyzes the received image formation command. The image formation command contains image data as data of an image to be formed, as well as designated image formation settings.

The second master controller 210 also performs predetermined image processing on the received image data. The second master controller 210 converts the image data into white-color data, gold-color data, silver-color data, and clear data with respect to the reproduction colors of the second image forming section 20, that is, the colors (white, gold, silver, and clear) of the toners serving as the colorants of the second image forming section 20, and outputs the white-color data, the gold-color data, the silver-color data, and the clear data.

Moreover, the second master controller 210 notifies the second slave controller 220 of the size and the material of the sheet according to the received image formation command.

The second slave controller 220 includes a CPU 221, a ROM 222, a RAM 223, a storage unit 224, and a communication unit 225. The CPU 221 uses the RAM 223 as a work area and executes programs read from the ROM 222 and the storage unit 224, so that functions of the second slave controller 220 to be described below are realized.

The second slave controller 220 exchanges control information with the second master controller 210 so as to perform control of, for example, exposure, development, and transfer processes in the second image forming section 20.

Furthermore, the second slave controller 220 acquires information about an error, such as a toner shortage in the second image forming section 20. The second slave controller 220 notifies the second master controller 210 of this error information. The second master controller 210 notifies the user of this error information by displaying the error information on the display panel of the UI 70. Then, for example, if the error is a toner shortage, the second slave controller 220 acquires information indicating that the error has been resolved when the toner is resupplied. Then, the second slave controller 220 notifies the second master controller 210 that the error has been resolved. The second master controller 210 notifies the user that the error has been resolved by displaying a message on the display panel of the UI 70.

Collaborative Operation Between First Controller 100 and Second Controller 200

The first controller 100 and the second controller 200 exchange information with each other after activation, cause the first image forming section 10 to second-transfer the four-color superposed toner image onto a sheet transported by the sheet transporter 40 operating under the control of the first controller 100, and cause the second image forming section 20 to second-transfer the other four-color superposed toner image onto the sheet. The expression "the first image forming section 10 second-transfers the four-color superposed toner image onto the sheet" may sometimes be expressed as "the first image forming section 10 forms an image" hereinafter. The expression "the second image forming section 20 second-transfers the other four-color superposed toner image onto the sheet" may sometimes be expressed as "the second image forming section 20 forms an image" hereinafter.

The process performed by the first controller 100 and the second controller 200 will be described below.

For example, after acquiring an image formation command output from the document creation application, if the command is given for forming images at the first image forming section 10 and the second image forming section 20, the printer driver in the terminal apparatus 8 converts the command into a command for the first master controller 110 and the second master controller 210. Then, the spooler outputs the command to each of the first master controller 110 and the second master controller 210. In this manner, the terminal apparatus 8 transmits an image formation command to each of the first master controller 110 and the second master controller 210. An image formation command given for forming images at the first image forming section 10 and the second image forming section 20 may sometimes be referred to as "cooperative command" hereinafter. The terminal apparatus 8 transmits a cooperative command to each of the first master controller 110 and the second master controller 210.

On the other hand, for example, if a command output from the document creation application is given for forming an image at the first image forming section 10 but not for forming an image at the second image forming section 20 (e.g., if a command is given for forming an image using the toners in the first image forming section 10 without using the toners in the second image forming section 20 or if a user designates an image forming process at the first image forming section 10 alone from the terminal apparatus 8 via the printer driver), the printer driver of the terminal apparatus 8 converts the command into a command for the first master controller 110. Then, the spooler outputs the command to the first master controller 110. Accordingly, the terminal apparatus 8 transmits an image formation command to the first master controller 110. An image formation command given for forming an image at the first image forming section 10 but not for forming an image at the second image forming section 20 may sometimes be referred to as "first independent command" hereinafter. The terminal apparatus 8 transmits a first independent command only to the first master controller 110. The terminal apparatus 8 causes the first independent command to contain information indicating that an image is to be formed at the first image forming section 10 but an image is not to be formed at the second image forming section 20.

For example, if a command output from the document creation application is given for forming an image at the second image forming section 20 but not for forming an image at the first image forming section 10 (e.g., if a command is given for forming an image using the toners in the second image forming section 20 without using the toners in the first image forming section 10 or if a user designates an image forming process at the second image forming section 20 alone from the terminal apparatus 8 via the printer driver), the printer driver of the terminal apparatus 8 converts the command into a command for the second master controller 210. Then, the spooler outputs the command to the second master controller 210. If an image is not to be formed at the first image forming section 10 but an image is to be formed at the second image forming section 20, since the first master controller 110 is to control, for example, the sheet transporter 40 and the fixing device 50, the printer driver converts the command output from, for example, the document creation application into a command for causing the first master controller 110 to control the sheet transporter 40 and the fixing device 50. Then, the spooler outputs the command to the first master controller 110. Accordingly, the terminal apparatus 8 transmits an image formation command to the first master controller 110 and the second master controller 210. An image formation command given for forming an image at the second image forming section 20 but not for forming an image at the first image forming section 10 may sometimes be referred to as "second independent command" hereinafter. The terminal apparatus 8 transmits a second independent command to each of the first master controller 110 and the second master controller 210. The terminal apparatus 8 causes the second independent command to contain information indicating that an image is to be formed at the second image forming section 20 but an image is not to be formed at the first image forming section 10.

FIGS. 5A and 5B illustrate an example of the process performed by the first controller 100 and the second controller 200. The process shown in FIGS. 5A and 5B corresponds to a case where a cooperative command is received by the first controller 100 and the second controller 200.

When the first master controller 110 receives an image formation command from, for example, the terminal apparatus 8 via the communication unit 115 in step S501, the first master controller 110 notifies the first slave controller 120 of designated image formation settings in step S502. Consequently, in step S503, the first slave controller 120 acquires the image formation settings and gives a command for image formation preparation. Image formation preparation involves, for example, preparing the sheet transporter 40 to make it capable of transporting a sheet (sometimes referred to as "transport preparation" hereinafter), and includes activation of a motor that rotates various types of rollers, such as the feed roller 44. Another example of image formation preparation involves preparing the fixing device 50 to make it fix a toner image onto a sheet, and includes increasing the temperature of the heating roller 51.

Subsequently, the first master controller 110 determines in step S504 whether or not an error, such as a toner shortage or a paper jam, has occurred in the first image forming section 10. If an error has not occurred (NO in step S504), the first master controller 110 transmits, to the second master controller 210, a preparation command for performing image formation preparation in the second image forming section 20 in step S505. If an error has occurred (YES in step S504), the first master controller 110 waits until the error is resolved.

In step S506, the second master controller 210 receives the preparation command transmitted from the first master controller 110. Then, if the image formation command is received from, for example, the terminal apparatus 8 via the communication unit 215 in step S507, the second master controller 210 notifies the second slave controller 220 of the image formation settings in step S508. Consequently, the second slave controller 220 acquires the image formation settings in step S509. Alternatively, the reception of the image formation command in step S507 may be performed prior to the reception of the preparation command from the first master controller 110 in step S506.

Subsequently, the second master controller 210 determines in step S510 whether or not an error, such as a toner shortage, has occurred in the second image forming section 20. If an error has not occurred (NO in step S510), the second master controller 210 notifies the second slave controller 220 of the preparation command for performing image formation preparation in the second image forming section 20 in step S511. After acquiring the preparation command in step S512, the second slave controller 220 commands the second image forming section 20 to perform image formation preparation in step S513. Image formation preparation involves performing preparation when the second image forming section 20 is to form an image, and includes, for example, a warm-up process of the developing devices 25, an image-quality adjustment process, and a process for spontaneously disposing deteriorated toners. All of these processes consume electric power and some may consume toner. When the image formation preparation is completed, the second image forming section 20 is set on standby. In contrast, if an error has occurred (YES in step S510), the second master controller 210 waits until the error is resolved.

When the image formation preparation in the second image forming section 20 is completed, the second master controller 210 transmits a completion notification indicating that the preparation is completed to the first master controller 110 in step S514. Alternatively, after the second slave controller 220 gives the command for image formation preparation in step S513, the second master controller 210 may determine that the image formation preparation in the second image forming section 20 is completed when the second master controller 210 receives a notification indicating that the preparation is completed from the second image forming section 20. As another alternative, after the second slave controller 220 gives the command for image formation preparation in step S513, the second master controller 210 may determine that the image formation preparation in the second image forming section 20 is completed when a predetermined period elapses.

After receiving the completion notification from the second master controller 210 in step S515, the first master controller 110 notifies the first slave controller 120 of the preparation command for performing image formation preparation in the first image forming section 10 in step S516. After acquiring the preparation command in step S517, the first slave controller 120 commands the first image forming section 10 to perform image formation preparation in step S518. Image formation preparation includes, for example, a warm-up process of the developing devices 15, an image-quality adjustment process, and a process for spontaneously disposing deteriorated toners. When the image formation preparation is completed, the first image forming section 10 is set on standby.

When the image formation preparation in the first image forming section 10 is completed, the first slave controller 120 causes the sheet transporter 40 to start transporting a sheet in step S519, and causes the first image forming section 10 to form an image on the transported sheet in step S520. Alternatively, after giving the command for image formation preparation in step S516, the first master controller 110 may determine that the image formation preparation in the first image forming section 10 is completed when the first master controller 110 receives a notification indicating that the preparation is completed from the first image forming section 10. As another alternative, after giving the command for image formation preparation in step S516, the first master controller 110 may determine that the image formation preparation in the first image forming section 10 is completed when a predetermined period elapses.

In step S521, the second slave controller 220 causes the second image forming section 20 to form an image on the transported sheet.

Then, the first slave controller 120 causes the fixing device 50 to fix the toner image on the transported sheet onto the sheet and to output the sheet having undergone the fixing process onto the sheet load section 60, and completes the image forming process in step S522.

In step S523, the first slave controller 120 notifies the first master controller 110 that the image forming process is completed. After acquiring the completion notification in step S524, the first master controller 110 transmits the completion notification indicating that the image forming process is completed to the second master controller 210 in step S525.

After receiving the completion notification in step S526, the second master controller 210 transmits information indicating the reception of the completion notification to the first master controller 110 in step S527.

After receiving the information indicating the reception of the completion notification in step S528, the first master controller 110 ends the image forming operation in step S529. The end of the image forming operation includes an end of the toner-image forming process in the first image forming section 10 and a process for deleting current-image-formation-related information stored in the RAM 113 and the storage unit 114.

After transmitting the information indicating the reception of the completion notification to the first master controller 110 in step S527, the second master controller 210 ends the image forming operation in step S530. The end of the image forming operation includes an end of the toner-image forming process in the second image forming section 20 and a process for deleting current-image-formation-related information stored in the RAM 213 and the storage unit 214.

Accordingly, in this exemplary embodiment, the image forming operation is performed by causing the first controller 100 and the second controller 200 to operate collaboratively with each other.

For example, if an error has not occurred in the first image forming section 10 or the sheet transporter 40, serving as a target to be controlled by the first master controller 110, the first master controller 110 transmits, to the second master controller 210 in step S505, a preparation command for performing image formation preparation in the second image forming section 20. After receiving this preparation command in step S506, the second master controller 210 notifies the second slave controller 220 of the preparation command for performing image formation preparation in the second image forming section 20 in step S511 if an error has not occurred in the second image forming section 20, serving as a target to be controlled by the second master controller 210. When the image formation preparation in the second image forming section 20 is completed, the second master controller 210 transmits a completion notification indicating that the preparation is completed to the first master controller 110 in step S514. After receiving the completion notification in step S515, the first master controller 110 notifies the first slave controller 120 of the preparation command for performing image formation preparation in the first image forming section 10 in step S516.

Accordingly, a time lag between the timing at which the first image forming section 10 starts to form an image and the timing at which the second image forming section 20 starts to form an image may be suppressed. This time lag may be caused when, for example, the first controller 100 and the second controller 200 operate independently of each other instead of collaboratively with each other. For example, a situation where an image forming process by the second image forming section 20 is not performed in time may be suppressed. Such a situation may occur when a sheet transport process is started by the sheet transporter 40 or an image forming process is started by the first image forming section 10 regardless of the fact that the image formation preparation in the second image forming section 20 is not completed.

Moreover, a situation where electric power is wastefully consumed due to the second image forming section 20 being on standby for a long period of time regardless of the fact that an error has occurred in the first image forming section 10 or the sheet transporter 40 may be suppressed. Furthermore, a situation where electric power is wastefully consumed due to the first image forming section 10 being on standby for a long period of time regardless of the fact that an error has occurred in the second image forming section 20 may be suppressed.

In this exemplary embodiment, when an image forming process is completed, the first master controller 110 transmits, to the second master controller 210 in step S525, a completion notification indicating that the image forming process is completed. Then, after receiving the completion notification in step S526, the second master controller 210 transmits information indicating the reception of the completion notification to the first master controller 110 in step S527.

Consequently, a situation where the second controller 200 is not able to ascertain that the fixing process by the fixing device 50 is completed and that the image forming process is completed due to the first controller 100 and the second controller 200 operating independently of each other may be suppressed.

If a command output from the document creation application is given for forming an image at the second image forming section 20 but not for forming an image at the first image forming section 10, the terminal apparatus 8 transmits a second independent command to each of the first master controller 110 and the second master controller 210. Accordingly, the first master controller 110 ascertains that an independent process involving not forming an image at the first image forming section 10 but forming an image at the second image forming section 20 is to be performed. Consequently, a situation where the time consumed from the reception of the image formation command by the image forming apparatus 2 to the completion of the image forming process becomes too long due to the terminal apparatus 8 transmitting the second independent command only to the second master controller 210 in the case of the independent process may be suppressed.

This will be described in detail below.

Figure 6A:
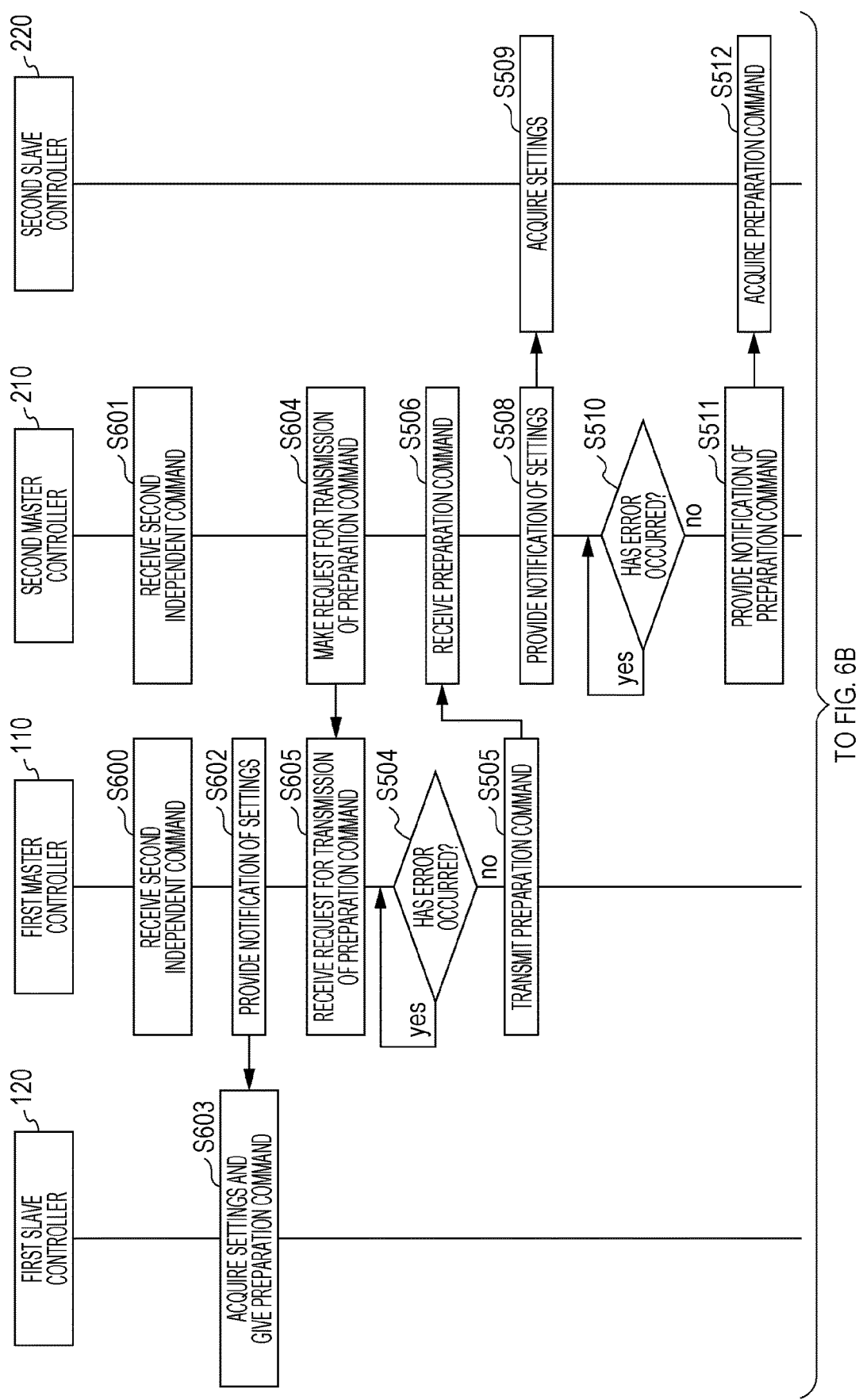

FIGS. 6A and 6B illustrate an example of a process performed by the first controller 100 and the second controller 200 when the first master controller 110 and the second master controller 210 each receive a second independent command. In FIGS. 6A and 6B, the first master controller 110 receives a second independent command in step S600, and the second master controller 210 receives a second independent command in step S601. In FIGS. 6A and 6B, steps identical to the steps shown in FIGS. 5A and 5B are given the same reference signs, and descriptions thereof will be omitted.

After receiving the second independent command in step S600, the first master controller 110 notifies the first slave controller 120 of the settings corresponding to the second independent command in step S602. In step S603, the first slave controller 120 acquires the settings corresponding to the second independent command and gives a command for image formation preparation. Accordingly, the sheet transporter 40 and the fixing device 50 perform image formation preparation, such as preparation for a sheet transporting process and a fixing process.

After receiving the second independent command in step S601, the second master controller 210 requests the first master controller 110 to transmit a preparation command for performing image formation preparation in the second image forming section 20 in step S604.

After receiving the request for transmitting a preparation command in step S605, the first master controller 110 determines in step S504 whether or not an error has occurred. If an error has occurred (YES in step S504), the first master controller 110 waits until the error is resolved. In contrast, if an error has not occurred (NO in step S504), the first master controller 110 transmits the preparation command to the second master controller 210 in step S505.

After receiving the preparation command in step S506, the second master controller 210 and the second slave controller 220 perform step S508 to step S514 described above with reference to FIGS. 5A and 5B.

After receiving a completion notification in step S515, the first master controller 110 notifies the first slave controller 120 in step S616 that a sheet transporting process and a fixing process are to be performed and preparation is not to be performed for forming an image at the second image forming section 20 without performing image formation preparation in the first image forming section 10. After acquiring the notification indicating that preparation is not to be performed in step S617, the first slave controller 120 causes the sheet transporter 40 to start transporting a sheet in step S619.

In step S521, the second slave controller 220 causes the second image forming section 20 to form an image on the transported sheet.

Then, the first slave controller 120 causes the fixing device 50 to fix the toner image on the transported sheet onto the sheet and to output the sheet having undergone the fixing process onto the sheet load section 60, completes the image forming process in step S522, and notifies the first master controller 110 in step S523 that the image forming process is completed.

Subsequently, the first master controller 110 and the second master controller 210 perform step S524 to step S530 described above with reference to FIGS. 5A and 5B.

As a comparative configuration, it is assumed that the first master controller 110 receives a completion notification from the second master controller 210 in step S515 without receiving a second independent command, and subsequently notifies the first slave controller 120 of a preparation command for performing preparation in the sheet transporter 40 and the fixing device 50. In this exemplary embodiment described above with reference to FIGS. 6A and 6B, the sheet transporter 40 and the fixing device 50 start to prepare for an image forming process when the first master controller 110 receives a second independent command at the same timing as when the second master controller 210 receives a second independent command. Accordingly, after the first master controller 110 receives a completion notification from the second master controller 210 in step S515, the sheet transporter 40 may quickly start to transport a sheet. As a result, in this exemplary embodiment, the time consumed from the reception of an image formation command (i.e., second independent command) by the image forming apparatus 2 to the completion of an image forming process may be shorter than that in the comparative configuration.

The following description relates to a process performed when the first master controller 110 receives a first independent command, determines that an image is not to be formed at the first image forming section 10, and determines to perform an independent process involving forming an image at the second image forming section 20 but not forming an image at the first image forming section 10. An example of a case where it is determined that an image is not to be formed at the first image forming section 10 is a case where a toner shortage has occurred with respect to the toners in the first image forming section 10. For example, if the first independent command contains information indicating that the toners in the first image forming section 10 are to be used but an image may be formed by using the toners in the second image forming section 20 if a toner shortage has occurred, the first master controller 110 determines that an image is not to be formed at the first image forming section 10, if a toner shortage has occurred, and determines to perform an independent process involving forming an image at the second image forming section 20. In such a case, the first master controller 110 processes the received first independent command into a second independent command, and transmits the second independent command to the second master controller 210. Alternatively, the first master controller 110 may transmit the second independent command to the second master controller 210 from outside the housing 3 via the communication line 9, or may transmit the second independent command from inside the housing 3 via the connection line 150.

Figure 7A:
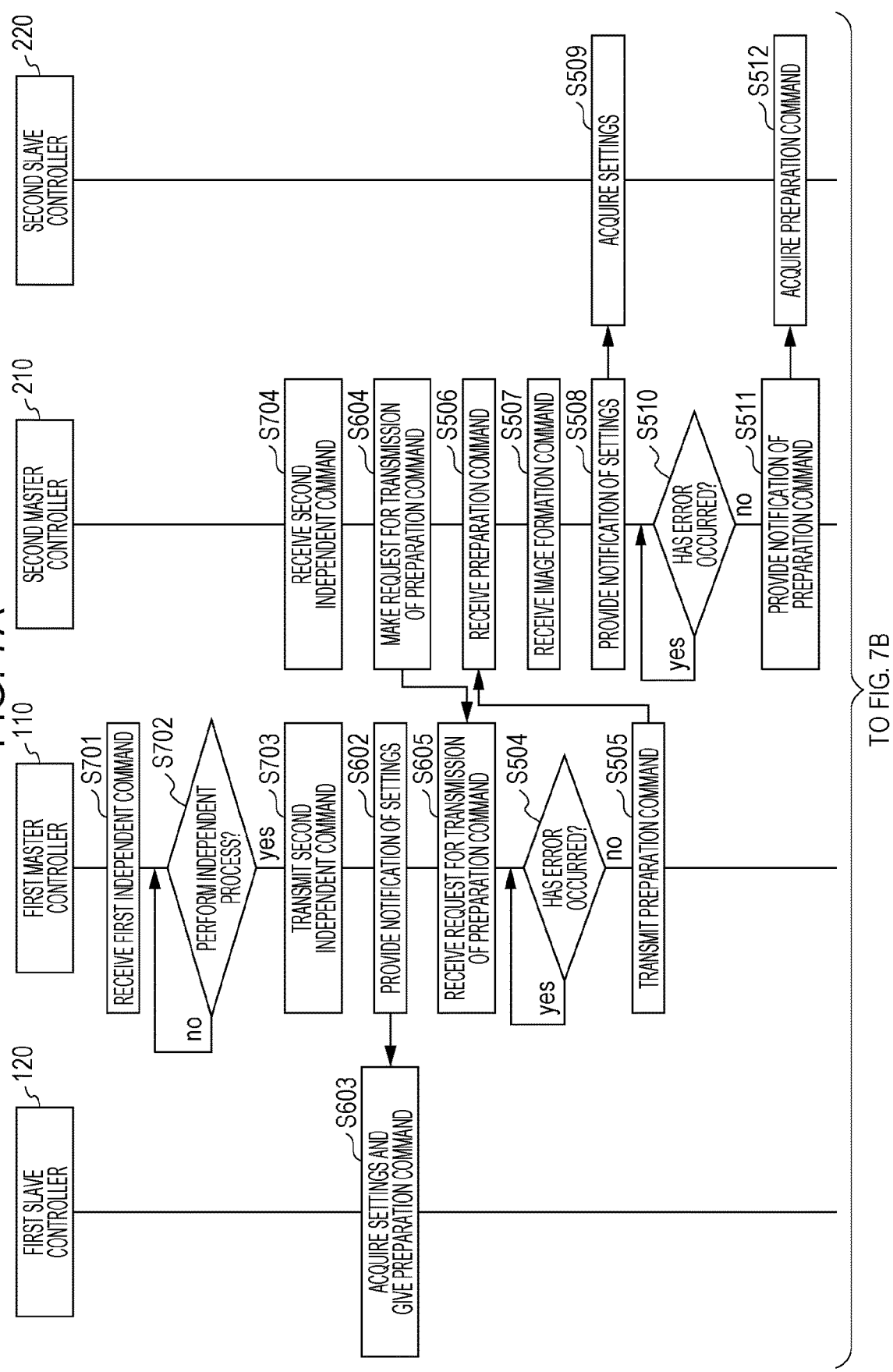

FIGS. 7A and 7B illustrate an example of a process performed by the first controller 100 and the second controller 200 when the first master controller 110 receives a first independent command and determines to perform an independent process. In FIGS. 7A and 7B, steps identical to the steps shown in FIGS. 6A and 6B are given the same reference signs, and descriptions thereof will be omitted.

When the first master controller 110 receives a first independent command in step S701, the first master controller 110 determines in step S702 whether or not to perform the above-described independent process, that is, a process corresponding to a second independent command. If the independent process is to be performed (YES in step S702), the first master controller 110 transmits a second independent command to the second master controller 210 via the connection line 150 in step S703. Then, the first master controller 110 notifies the first slave controller 120 of the settings corresponding to the second independent command in step S602. In step S603, the first slave controller 120 acquires the settings corresponding to the second independent command and gives a command for image formation preparation. Accordingly, the sheet transporter 40 and the fixing device 50 perform image formation preparation, such as preparation for a sheet transporting process and a fixing process.

When the second master controller 210 receives the second independent command transmitted from the first master controller 110 in step S704, the first controller 100 and the second controller 200 perform step S604 and onward described above.

In this exemplary embodiment described above with reference to FIGS. 7A and 7B, the sheet transporter 40 and the fixing device 50 start to prepare for an image forming process when the first master controller 110 determines to perform the independent process. Accordingly, after the first master controller 110 receives a completion notification from the second master controller 210 in step S515, the sheet transporter 40 may quickly start transporting a sheet. As a result, in this exemplary embodiment, the time consumed from the reception of an image formation command (i.e., second independent command) by the image forming apparatus 2 to the completion of an image forming process may be shorter than that in the comparative configuration.

A process performed by the first master controller 110 will be described below with reference to flowcharts.

Figure 8:
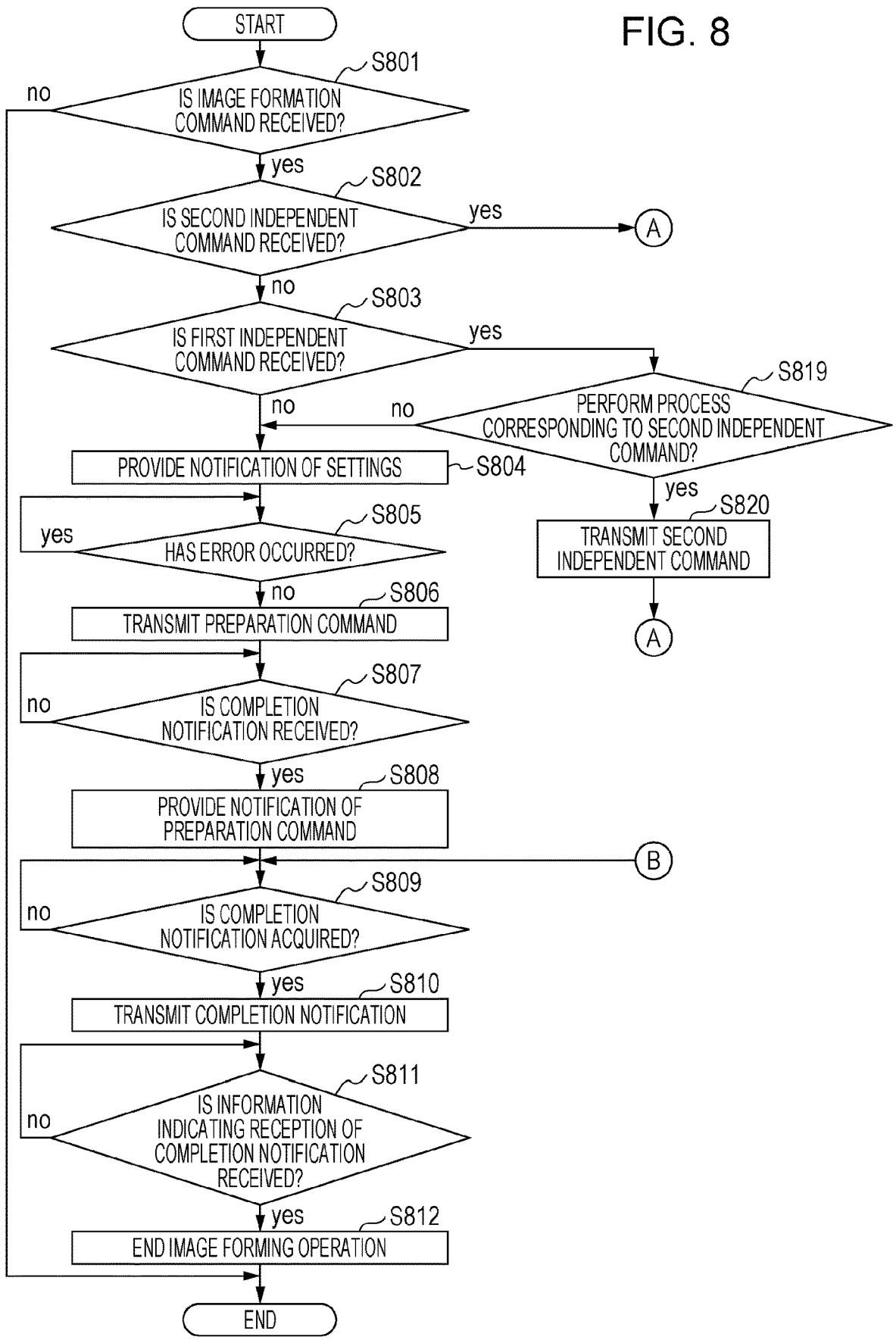
FIG. 8 is a flowchart illustrating an example of a process performed by the first master controller.
Figure 9:
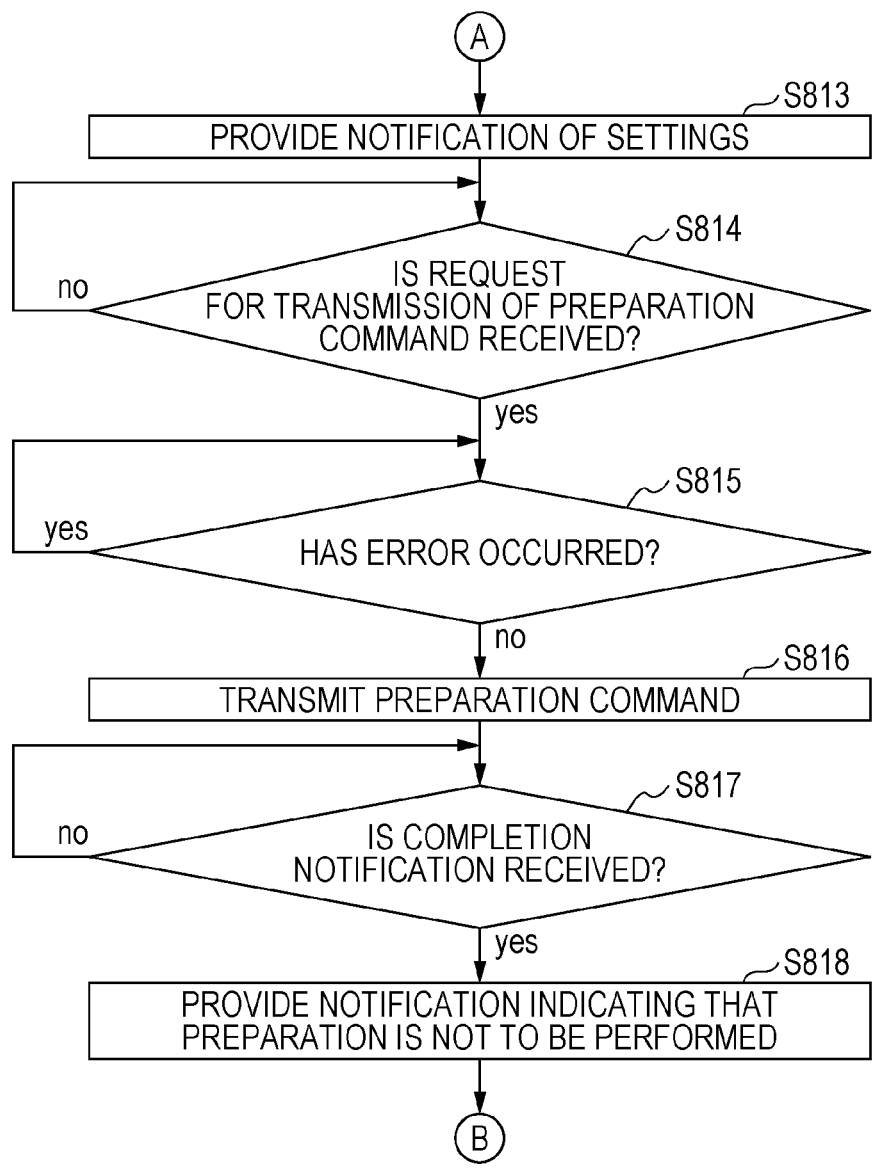
FIG. 9 is a flowchart illustrating the example of the process performed by the first master controller.

FIGS. 8 and 9 are flowcharts illustrating an example of the process performed by the first master controller 110. The first master controller 110 repeatedly performs this process at every predetermined fixed time period (e.g., 1 millisecond).

In step S801, the first master controller 110 determines whether or not an image formation command is received from, for example, the terminal apparatus 8. If an image formation command is received (YES in step S801), the first master controller 110 determines in step S802 whether or not a second independent command is received from, for example, the terminal apparatus 8. Then, if a second independent command is not received (NO in step S802), the first master controller 110 determines in step S803 whether or not a first independent command is received from, for example, the terminal apparatus 8. If a first independent command is not received (NO in step S803), the first master controller 110 notifies the first slave controller 120 in step S804 of the image formation settings corresponding to a cooperative command since the image formation command received in step S801 is a cooperative command. Step S804 corresponds to step S502 described above with reference to FIGS. 5A and 5B.

Subsequently, the first master controller 110 determines in step S805 whether or not an error has occurred. If an error has occurred (YES in step S805), the first master controller 110 waits until the error is resolved. In contrast, if an error has not occurred (NO in step S805), the first master controller 110 transmits, to the second master controller 210 in step S806, a preparation command for performing image formation preparation in the second image forming section 20. Steps S805 and S806 respectively correspond to steps S504 and S505 described above with reference to FIGS. 5A and 5B.

Then, the first master controller 110 determines in step S807 whether or not a completion notification is received from the second master controller 210. If a completion notification is not received (NO in step S807), the first master controller 110 waits until it receives the completion notification. In contrast, if a completion notification is received (YES in step S807 (i.e., this step corresponds to step S515 described above with reference to FIGS. 5A and 5B)), the first master controller 110 notifies the first slave controller 120 of the preparation command for performing image formation preparation in the first image forming section 10 in step S808. Step S808 corresponds to step S516 described above with reference to FIGS. 5A and 5B.

Subsequently, in step S809, the first master controller 110 determines whether or not a completion notification indicating that the image forming process is completed is acquired from the first slave controller 120. If a completion notification is acquired (YES in step S809), the first master controller 110 transmits the completion notification indicating that the image forming process is completed to the second master controller 210 in step S810. Step S810 corresponds to step S525 described above with reference to FIGS. 5A and 5B.

Subsequently, the first master controller 110 determines in step S811 whether or not information indicating the reception of the completion notification is received from the second master controller 210. If information indicating the reception of the completion notification is not received (NO in step S811), the first master controller 110 waits until it receives the information. In contrast, if information indicating the reception of the completion notification is received (YES in step S812 (i.e., this step corresponds to step S528 described above with reference to FIGS. 5A and 5B)), the first master controller 110 ends the image forming operation in step S812.

On the other hand, if a second independent command is received in step S802 (YES in step S802), the first master controller 110 notifies the first slave controller 120 in step S813 of the image formation settings corresponding to the second independent command. Step S813 corresponds to step S602 described above with reference to FIGS. 6A and 6B. Then, the first master controller 110 determines in step S814 whether or not a request for transmission of a preparation command is received. If a request for transmission of a preparation command is not received (NO in step S814), the first master controller 110 waits until it receives the request. In contrast, if a request for transmission of a preparation command is received (YES in step S814 (i.e., this step corresponds to step S605 described above with reference to FIGS. 6A and 6B)), the first master controller 110 determines in step S815 whether or not an error has occurred. If an error has occurred (YES in step S815), the first master controller 110 waits until the error is resolved. In contrast, if an error has not occurred (NO in step S815), the first master controller 110 transmits a preparation command for performing image formation preparation in the second image forming section 20 to the second master controller 210 in step S816. Steps S815 and S816 respectively correspond to steps S504 and S505 in FIGS. 6A and 6B.

Then, the first master controller 110 determines in step S817 whether or not a completion notification is received from the second master controller 210. If a completion notification is not received (NO in step S817), the first master controller 110 waits until it receives the completion notification. In contrast, if a completion notification is received (YES in step S817 (i.e., this step corresponds to step S515 in FIGS. 6A and 6B)), the first master controller 110 transmits information indicating that the aforementioned preparation is not to be performed to the first slave controller 120 in step S818, and performs step S809 and onward. Step S818 corresponds to step S616 in FIGS. 6A and 6B.

On the other hand, if a first independent command is received in step S803 (YES in step S803), the first master controller 110 determines in step S819 whether or not a process corresponding to a second independent command is to be performed. Step S819 corresponds to step S702 described above with reference to FIGS. 7A and 7B. If the first master controller 110 determines to perform a process corresponding to a second independent command (YES in step S819), the first master controller 110 transmits a second independent command to the second master controller 210 in step S820. Step S820 corresponds to step S703 described above with reference to FIGS. 7A and 7B. In contrast, if the first master controller 110 determines not to perform a process corresponding to a second independent command (NO in step S819), the first master controller 110 performs step S804 and onward.

A process performed by the second master controller 210 will be described below with reference to a flowchart.

Figure 10:
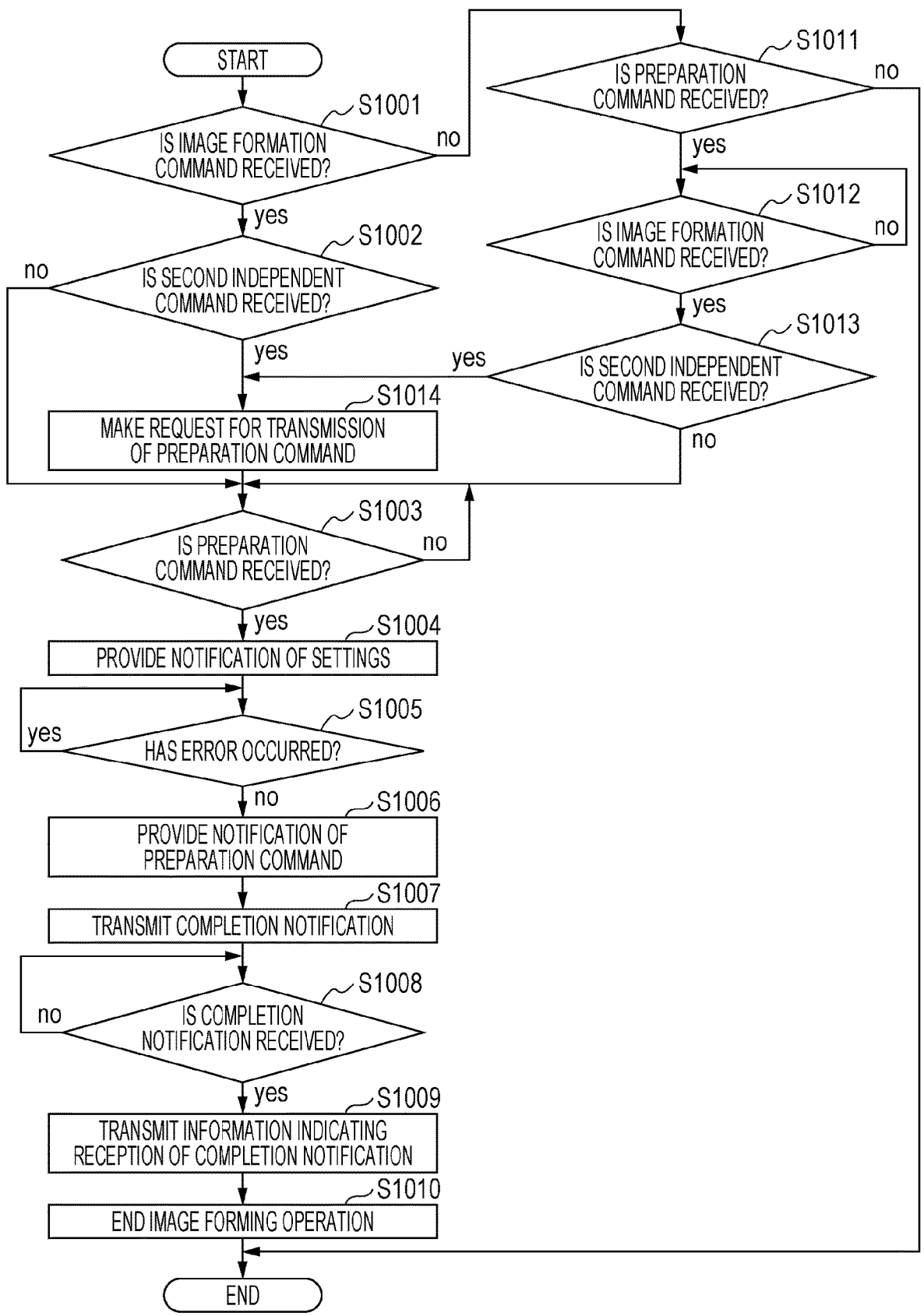
FIG. 10 is a flowchart illustrating an example of a process performed by the second master controller.

FIG. 10 is a flowchart illustrating an example of the process performed by the second master controller 210. The second master controller 210 repeatedly performs this process at every predetermined fixed time period (e.g., 1 millisecond).

In step S1001, the second master controller 210 determines whether or not an image formation command is received from, for example, the terminal apparatus 8. If an image formation command is received (YES in step S1001), the second master controller 210 determines in step S1002 whether or not a second independent command is received. If a second independent command is not received (NO in step S1002), the second master controller 210 determines in step S1003 whether or not a preparation command is received from the first master controller 110. If a preparation command is not received (NO in step S1003), the second master controller 210 waits until it receives the preparation command. In contrast, if a preparation command is received (YES in step S1003 (i.e. this step corresponds to step S506 described above with reference to FIGS. 5A and 5B)), the second master controller 210 notifies the second slave controller 220 of the designated image formation settings in step S1004. Step S1004 corresponds to step S508 in FIGS. 6A and 6B.

Subsequently, the second master controller 210 determines in step S1005 whether or not an error has occurred in the second image forming section 20. Step S1005 corresponds to step S510 in FIGS. 5A and 5B. If an error has occurred (YES in step S1005), the second master controller 210 waits until the error is resolved. In contrast, if an error has not occurred (NO in step S1005), the second master controller 210 notifies the second slave controller 220 of the preparation command for performing image formation preparation in the second image forming section 20 in step S1006. Step S1006 corresponds to step S511 in FIGS. 6A and 6B. Then, the second master controller 210 transmits a completion notification to the first master controller 110 in step S1007. Step S1007 corresponds to step S514 in FIGS. 6A and 6B.

Subsequently, the second master controller 210 determines in step S1008 whether or not a completion notification indicating that the image forming process is completed is received from the first master controller 110. If a completion notification is not received (NO in step S1008), the second master controller 210 waits until it receives the completion notification. In contrast, if a completion notification is received (YES in step S1008 (i.e., this step corresponds to step S526 in FIGS. 5A and 5B)), the second master controller 210 transmits information indicating the reception of the completion notification to the first master controller 110 in step S1009. Step S1009 corresponds to step S527 in FIGS. 5A and 5B. Then, the second master controller 210 ends the image forming operation in step S1010.

On the other hand, if an image formation command is not received in step S1001 (NO in step S1001), the second master controller 210 determines in step S1011 whether or not a preparation command is received from the first master controller 110. If a preparation command is received (YES in step S1011), the second master controller 210 determines in step S1012 whether or not an image formation command is received from, for example, the terminal apparatus 8. If an image formation command is not received (NO in step S1012), the second master controller 210 waits until it receives the image formation command. In contrast, if an image formation command is received (YES in step S1012), the second master controller 210 determines in step S1013 whether or not a second independent command is received. If a second independent command is not received (NO in step S1013), the second master controller 210 performs step S1003 and onward.

On the other hand, if a second independent command is received in step S1002 or step S1013 (YES in step S1002 or YES in step S1013), the second master controller 210 requests the first master controller 110 to transmit a preparation command for performing image formation preparation in the second image forming section 20 in step S1014. Step S1014 corresponds to step S604 in FIGS. 6A and 6B or FIGS. 7A and 7B.

In the exemplary embodiment above, the functions of the first controller 100 are executed by the CPU 111 of the first master controller 110 and the CPU 121 of the first slave controller 120 operating in cooperation with each other. Alternatively, the configuration is not particularly limited to that described above. For example, the functions of the first controller 100 may be realized by a single processor, or may be realized by using three or more processors. Likewise, in the exemplary embodiment above, the functions of the second controller 200 are executed by the CPU 211 of the second master controller 210 and the CPU 221 of the second slave controller 220 operating in cooperation with each other. Alternatively, the configuration is not particularly limited to that described above. For example, the functions of the second controller 200 may be realized by a single processor, or may be realized by using three or more processors. In the exemplary embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

The image forming apparatus 2 described above includes the CPU 111 and the CPU 121 as an example of a first processor configured to control the sheet transporter 40 serving as an example of a transporter that transports a sheet and the first image forming section 10 that forms an image on the sheet transported by the sheet transporter 40, and the CPU 211 and the CPU 221 as an example of a second processor configured to control the second image forming section 20 that forms an image on the sheet transported by the sheet transporter 40.

When the first processor receives an image formation command from outside the housing 3 and determines to perform an image forming process at the first image forming section 10, the first processor performs transport preparation for transporting a sheet at the sheet transporter 40 and receives, from the second processor, a completion notification corresponding to a preparation command, for performing image formation preparation in the second image forming section 20, transmitted to the second processor via the connection line 150 in the housing 3 (step S515), and subsequently causes the sheet transporter 40 to transport a sheet and the first image forming section 10 to form an image.

Furthermore, if the first processor ascertains that an independent process involving not forming an image at the first image forming section 10 but forming an image at the second image forming section 20 is to be performed, the first processor performs the transport preparation (step S603) before receiving the completion notification (step S515), and causes the sheet transporter 40 to transport a sheet (step S519) after receiving the completion notification (step S515).

According to the image forming apparatus 2 having the above-described configuration, the time consumed from the reception of an image formation command to the completion of an image forming process in the case of an independent process may be shorter than that in a case where the first processor does not perform image formation preparation until it receives a completion notification.

The first processor ascertains that the independent process is to be performed by receiving a second independent command as an example of an image formation command for the independent process from outside the housing 3 (step S600).

The second processor transmits a request for transmission of a preparation command to the first processor (step S604) by receiving, from outside the housing 3, a second independent command as an example of an image formation command related to the independent process but different from the image formation command for the independent process received by the first processor (step S601). When the first processor receives the request from the second processor (step S605), the first processor transmits a preparation command to the second processor (step S505).

After receiving a first independent command as an example of an image formation command (step S701), the first processor determines not to perform an image forming process at the first image forming section 10 (YES in step S701), so as to ascertain that an independent process is to be performed. The first processor may ascertain that an independent process is to be performed quicker than in a case where, for example, the first processor transmits, to the terminal apparatus 8, information indicating that an image forming process is not to be performed at the first image forming section 10 and the terminal apparatus 8 transmits, to the first processor, information indicating that an independent process is to be performed.

If the first processor determines not to perform an image forming process at the first image forming section 10 (YES in step S701), the first processor transmits a second independent command as an example of a command for performing an independent process to the second processor via an external unit provided outside the housing 3 (step S703). Consequently, a command for performing an independent process may be transmitted quicker than in a case where, for example, the first processor transmits a second independent command to the second processor via the connection line 150 connected with the second processor provided inside the housing 3, and the amount of information transmittable via the connection line 150 is smaller than the amount of information transmittable via the communication line 9.

If an abnormality (e.g., a toner shortage with respect to the toners in the first image forming section 10) has occurred in the first image forming section 10, the first processor may determine not to perform an image forming process at the first image forming section 10.

The image forming system 1 described above includes an image forming apparatus having a single housing 3 that contains therein a first processor and a second processor. The first processor controls the sheet transporter 40 that transports a sheet and the first image forming section 10 that forms an image on the sheet transported by the sheet transporter 40. The second processor controls the second image forming section 20 that forms an image on the sheet transported by the sheet transporter 40.

Furthermore, the image forming system 1 described above includes the terminal apparatus 8. If images are to be formed at the first image forming section 10 and the second image forming section 20, the terminal apparatus 8 transmits a command for forming an image at the first image forming section 10 to the first processor and transmits a command for forming an image at the second image forming section 20 to the second processor. If an image is not to be formed at the first image forming section 10 but an image is to be formed at the second image forming section 20, the terminal apparatus 8 transmits, to the first processor, a second independent command as an example of a command for not forming an image at the first image forming section 10 but for forming an image at the second image forming section 20, and transmits a second independent command as an example of a command for forming an image at the second image forming section 20 to the second processor.

Accordingly, if an image is not to be formed at the first image forming section 10 but an image is to be formed at the second image forming section 20, the terminal apparatus 8 transmits a second independent command to each of the first processor and the second processor. Specifically, the terminal apparatus 8 transmits a second independent command for forming an image at the second image forming section 20 to the second processor that controls the second image forming section 20 that is to form the image. In addition, the terminal apparatus 8 transmits a second independent command for not forming an image at the first image forming section 10 to the first processor that controls the first image forming section 10 that is not to form an image. Consequently, when the first processor receives a second independent command, the first processor may prepare for an image forming process for forming an image at the second image forming section 20, so that the time consumed from the reception of an image formation command to the completion of an image forming process may be shorter than in a case where the first processor does not prepare for an image forming process until it receives a completion notification from the second processor.

The programs executed by the CPU 111 of the first master controller 110, the CPU 121 of the first slave controller 120, the CPU 211 of the second master controller 210, and the CPU 221 of the second slave controller 220 may each be provided by being stored in a computer-readable storage medium, such as a magnetic storage medium (e.g., magnetic tape or a magnetic disk), an optical storage medium (e.g., an optical disk), a magneto-optical storage medium, or a semiconductor memory, or may each be downloaded by using a communication unit, such as the Internet.

A program according to an exemplary embodiment of the disclosure causes the first processor to execute a function. The first processor is configured to control the sheet transporter 40 that transports a sheet and the first image forming section 10 that forms an image on the sheet transported by the sheet transporter 40. The function of the first processor includes performing transport preparation for transporting the sheet at the sheet transporter 40 when the first processor receives an image formation command from outside the housing 3 and determines to perform an image forming process at the first image forming section 10, receiving, from the second processor configured to control the second image forming section 20 that forms an image on the sheet transported by the sheet transporter 40, a completion notification corresponding to a preparation command, transmitted to the second processor via the connection line 150 in the housing 3, for performing image formation preparation in the second image forming section 20, and subsequently causing the sheet transporter 40 to transport the sheet and the first image forming section 10 to form the image.

Moreover, in the program according to the exemplary embodiment of the disclosure, if the first processor ascertains that an independent process involving not forming an image at the first image forming section 10 but forming an image at the second image forming section 20 is to be performed, the first processor performs the transport preparation before receiving the completion notification, and causes the sheet transporter 40 to transport the sheet after receiving the completion notification.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a first processor configured to control a transporter that transports a sheet and a first image forming section that forms an image on the sheet transported by the transporter; and
a second processor configured to control a second image forming section that forms an image on the sheet transported by the transporter,
wherein the first processor and the second processor are contained in a single housing,
wherein, when the first processor receives an image formation command from outside the housing and determines to perform an image forming process at the first image forming section, the first processor is configured to perform transport preparation for transporting the sheet at the transporter and receive, from the second processor, a completion notification corresponding to a preparation command, for performing image formation preparation in the second image forming section, transmitted to the second processor via an inside of the housing, and subsequently cause the transporter to transport the sheet and the first image forming section to form the image, and wherein, if the first processor ascertains that an independent process involving not forming the image at the first image forming section but forming the image at the second image forming section is to be performed, the first processor is configured to perform the transport preparation before receiving the completion notification, and cause the transporter to transport the sheet after receiving the completion notification, wherein the first processor is configured to ascertain that the independent process is to be performed by receiving an image formation command for the independent process from outside the housing, wherein the second processor is configured to transmit a request for transmission of the preparation command to the first processor by receiving, from outside the housing, an image formation command related to the independent process but different from the image formation command for the independent process received by the first processor, and wherein the first processor is configured to transmit the preparation command to the second processor when the request is received from the second processor.

2. The image forming apparatus according to claim 1, wherein the first processor is configured to ascertain that the independent process is to be performed by determining that the image forming process is not to be performed at the first image forming section after receiving the image formation command.

3. The image forming apparatus according to claim 2, wherein, if the first processor determines not to perform the image forming process at the first image forming section, the first processor is configured to transmit a command for performing the independent process to the second processor via an outside of the housing.

4. The image forming apparatus according to claim 3, wherein the first processor determines not to perform the image forming process at the first image forming section if an abnormality has occurred in the first image forming section.

5. The image forming apparatus according to claim 2, wherein the first processor determines not to perform the image forming process at the first image forming section if an abnormality has occurred in the first image forming section.

6. An image forming system comprising:
an image forming apparatus including a first processor configured to control a transporter that transports a sheet and a first image forming section that forms an image on the sheet transported by the transporter, and a second processor configured to control a second image forming section that forms an image on the sheet transported by the transporter, the first processor and the second processor being contained in a single housing; and a terminal apparatus configured to transmit a command for forming the image at the first image forming section to the first processor and transmit a command for forming the image at the second image forming section to the second processor if the images are to be formed at the first image forming section and the second image forming section, wherein, if the image is not to be formed at the first image forming section but the image is to be formed at the second image forming section, the terminal apparatus is configured to transmit, to the first processor, a command for not forming the image at the first image forming section but for forming the image at the second image forming section and transmit a command for forming the image at the second image forming section to the second processor, wherein the first processor is configured to ascertain that the independent process is to be performed by receiving an image formation command for the independent process from outside the housing, wherein the second processor is configured to transmit a request for transmission of the preparation command to the first processor by receiving, from outside the housing, an image formation command related to the independent process but different from the image formation command for the independent process received by the first processor, and wherein the first processor is configured to transmit the preparation command to the second processor when the request is received from the second processor.

7. A non-transitory computer readable medium storing a program causing a first processor to execute a process, the first processor being configured to control a transporter that transports a sheet and a first image forming section that forms an image on the sheet transported by the transporter, the process comprising:

performing transport preparation for transporting the sheet at the transporter and receiving, from a second processor, a completion notification corresponding to a preparation command, for performing image formation preparation in a second image forming section, transmitted to the second processor via an inside of the housing when the first processor receives an image formation command from outside the housing and determines to perform an image forming process at the first image forming section, and subsequently causing the transporter to transport the sheet and the first image forming section to form the image, the second processor being configured to control the second image forming section that forms an image on the sheet transported by the transporter; and performing the transport preparation before the first processor receives the completion notification, and causing the transporter to transport the sheet after the first processor receives the completion notification, if the first processor ascertains that an independent process involving not forming the image at the first image forming section but forming the image at the second image forming section is to be performed;

wherein the first processor is configured to ascertain that the independent process is to be performed by receiving an image formation command for the independent process from outside the housing, wherein the second processor is configured to transmit a request for transmission of the preparation command to the first processor by receiving, from outside the housing, an image formation command related to the independent process but different from the image formation command for the independent process received by the first processor, and wherein the first processor is configured to transmit the preparation command to the second processor when the request is received from the second processor.

* * * * *